United States Patent
Rohrer

(10) Patent No.: US 9,863,395 B2
(45) Date of Patent: Jan. 9, 2018

(54) WAVE ENERGY CONVERTER WITH CONCURRENT MULTI-DIRECTIONAL ENERGY ABSORPTION

(71) Applicant: John W. Rohrer, York, ME (US)

(72) Inventor: John W. Rohrer, York, ME (US)

(73) Assignee: Rohrer Technologies, Inc., York, ME (US)

(*) Notice: Subject to any disclaimer, the term of this patent is extended or adjusted under 35 U.S.C. 154(b) by 543 days.

(21) Appl. No.: 14/530,723

(22) Filed: Nov. 1, 2014

(65) Prior Publication Data
US 2015/0082785 A1   Mar. 26, 2015

Related U.S. Application Data

(63) Continuation-in-part of application No. 14/101,325, filed on Dec. 9, 2013, now Pat. No. 9,127,640, which
(Continued)

(51) Int. Cl.
*F03B 13/06* (2006.01)
*F03B 13/18* (2006.01)

(52) U.S. Cl.
CPC .......... *F03B 13/186* (2013.01); *F03B 13/182* (2013.01); *F05B 2270/18* (2013.01); *Y02E 10/38* (2013.01)

(58) Field of Classification Search
CPC .......... F01D 15/10; F01D 15/20; F03B 15/00; F03B 13/18; F03B 13/14
See application file for complete search history.

(56) References Cited

U.S. PATENT DOCUMENTS

| 1,887,316 A | * | 11/1932 | Lockfaw | F03B 13/182 |
| | | | | 417/330 |
| 3,644,052 A | * | 2/1972 | Lininger | F03B 13/141 |
| | | | | 415/124.1 |

(Continued)

FOREIGN PATENT DOCUMENTS

| CA | 2289092 A1 | 11/1998 |
| CA | 2 847 346 A1 | 3/2013 |

(Continued)

OTHER PUBLICATIONS

Lin and Salter, Wide Tank Efficiency Measurements on a Model of the Sloped IPS Buoy . . . , 3rd European Wave Energy Conference, Oct. 2, 1998 (Retrieved from Internet on Dec. 3, 2013 @ www.see.ac.uk/wave%20Energy/slopedips3pdf).

(Continued)

*Primary Examiner* — Mark Laurenzi
*Assistant Examiner* — Shafiq Mian
(74) *Attorney, Agent, or Firm* — Lorusso & Associates

(57) ABSTRACT

An ocean wave energy converter (WEC) using one or more elongated light-weight low-cost surface floats, oriented and self-orienting parallel to oncoming wave fronts are mechanically linked to a motion stabilized or fixed frame or base through one or more power take-offs in such manner that multi-directional rotational and translational wave-induced forces and relative motion between the float(s) and base are efficiently captured. Some embodiments have at least one forward positioned float that moves upward and rearward on wave crests and downward and forward on ensuing wave troughs to capture a majority of both heave and surge wave energy components. Other embodiments also provide apparatus and means to totally submerge the floats during severe seas or adjust submerged depth and float mass to optimize performance.

12 Claims, 17 Drawing Sheets

Related U.S. Application Data is a continuation-in-part of application No. 13/506,680, filed on May 8, 2012, now Pat. No. 8,614,520.

(60) Provisional application No. 61/996,338, filed on May 5, 2014.

(56) References Cited

U.S. PATENT DOCUMENTS

| | | | |
|---|---|---|---|
| 4,098,084 A | 7/1978 | Cockerell | |
| 4,170,738 A * | 10/1979 | Smith | F03B 13/185 185/30 |
| 4,170,898 A * | 10/1979 | Salter | G01M 10/00 4/491 |
| 4,179,886 A * | 12/1979 | Tsubota | F03B 13/184 415/3.1 |
| 4,295,800 A | 10/1981 | Packer | |
| 4,408,455 A * | 10/1983 | Montgomery | F03B 13/1815 60/497 |
| 4,426,950 A * | 1/1984 | Cholet | B63B 21/66 114/245 |
| 4,718,231 A * | 1/1988 | Vides | F03B 13/1815 60/398 |
| 5,066,867 A * | 11/1991 | Shim | F03B 13/1885 290/53 |
| 5,132,550 A * | 7/1992 | McCabe | B01D 61/10 290/42 |
| 5,405,250 A | 4/1995 | Vowles et al. | |
| 5,929,531 A * | 7/1999 | Lagno | F03B 13/262 290/42 |
| 6,109,029 A * | 8/2000 | Vowles | B01D 61/10 270/42 |
| 7,476,137 B2 | 1/2009 | Stewart et al. | |
| 7,737,568 B2 | 6/2010 | Vowles et al. | |
| 7,785,163 B2 | 8/2010 | Spencer et al. | |
| 7,878,734 B2 | 2/2011 | Bull et al. | |
| 7,909,536 B2 | 3/2011 | Dick | |
| 8,093,736 B2 | 1/2012 | Rafferty | |
| 8,123,579 B2 | 2/2012 | Gerber | |
| 8,317,555 B2 * | 11/2012 | Jacobsen | B63C 11/34 114/312 |
| 8,508,063 B2 * | 8/2013 | Rhinefrank | F03B 13/20 290/53 |
| 8,536,724 B2 | 9/2013 | Dullaway | |
| 2002/0067043 A1 | 6/2002 | Ovadia | |
| 2006/0208494 A1 * | 9/2006 | Cook | F03B 13/20 290/53 |
| 2008/0093852 A1 | 4/2008 | Vowles et al. | |
| 2008/0169653 A1 * | 7/2008 | Olson | F03B 13/1815 290/53 |
| 2010/0140944 A1 * | 6/2010 | Gardiner | F03B 13/16 290/53 |
| 2010/0213710 A1 | 8/2010 | Rhinefrank et al. | |
| 2011/0068579 A1 * | 3/2011 | Dullaway | F03B 13/1815 290/53 |
| 2012/0087732 A1 | 4/2012 | Gray | |
| 2012/0317970 A1 * | 12/2012 | Edvardsen | F03B 13/189 60/496 |
| 2013/0081388 A1 | 4/2013 | Straume et al. | |

FOREIGN PATENT DOCUMENTS

| | | |
|---|---|---|
| DE | 41 43 011 C1 | 4/1993 |
| WO | 2008/004893 A1 | 1/2008 |
| WO | 2008/111849 A1 | 9/2008 |
| WO | 2008/135046 A2 | 11/2008 |
| WO | WO 2010/011370 A1 | 1/2010 |
| WO | 2011/065841 A1 | 6/2011 |
| WO | 2011/071390 A2 | 6/2011 |
| WO | WO 2012/053899 A1 | 4/2012 |

OTHER PUBLICATIONS

Columbia Power Technologies "Sting Ray" Wave Energy Converter (Retrieved from Internet on Dec. 3, 2013 @ www.columbiapwr.com/ray-series/).

Moe and Ersdal, "Aker WEC Prototype Model Test", Final Report, Jul. 7, 2014, pp. 1,3.5,9; Marinet EC FP7 Program (Retrieved from the Internet on Dec. 3, 2014 @ www.fp7-marinet.eu/access-menu-post).

\* cited by examiner

Aquamarine "Oyster" (Related Art)

Langlee Robusto (Related Art)

McCabe Wave Pump (Related Art)

Dexawave (Related Art)

Columbia Power StingRAY (Related Art)

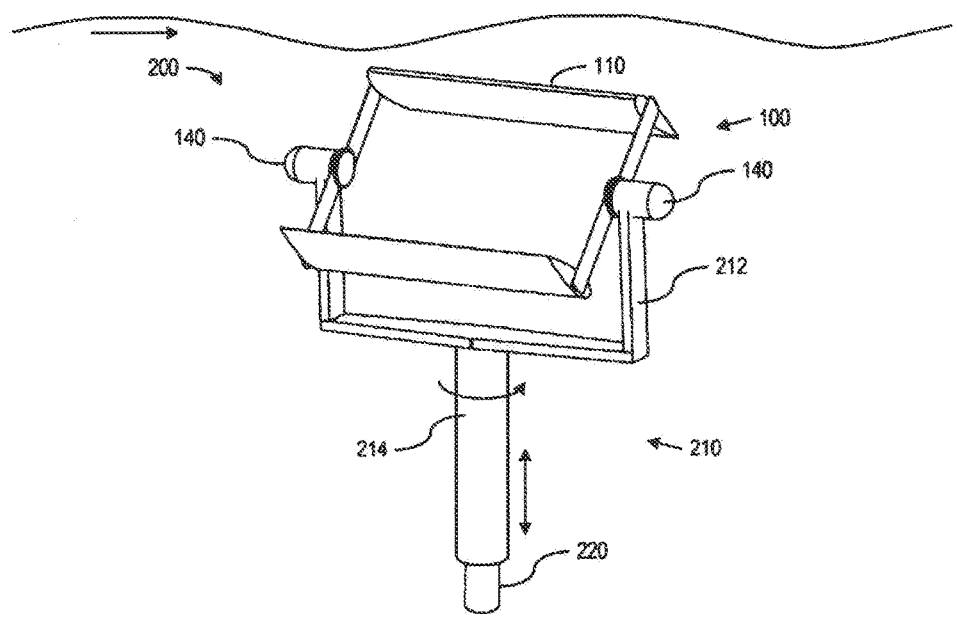
Atargis (Related Art)  FIG. 6
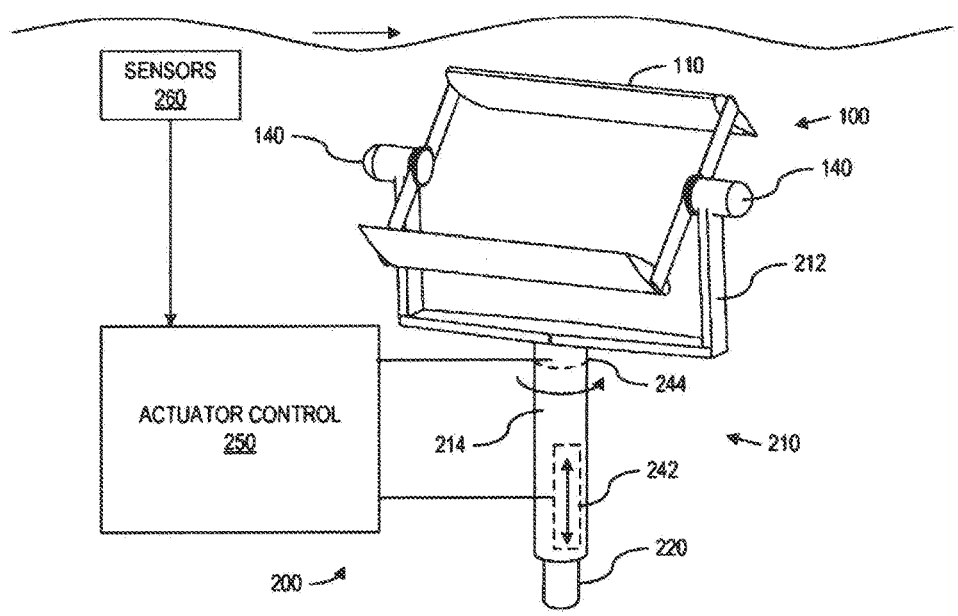
Atargis (Related Art)
FIG. 7

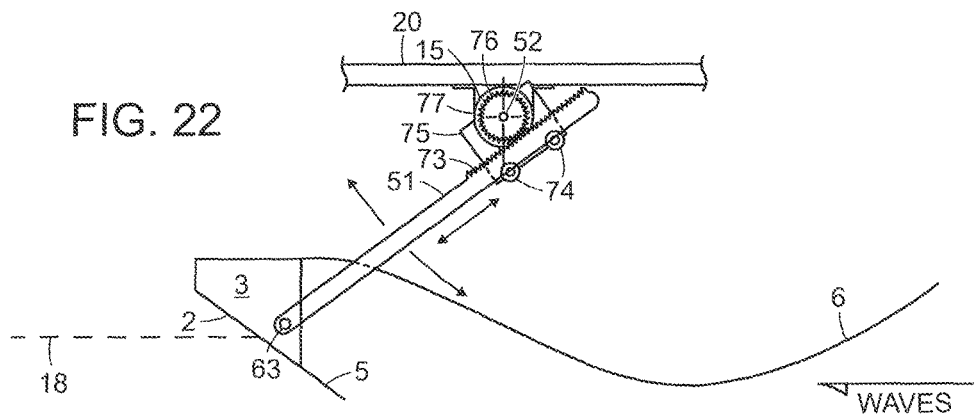
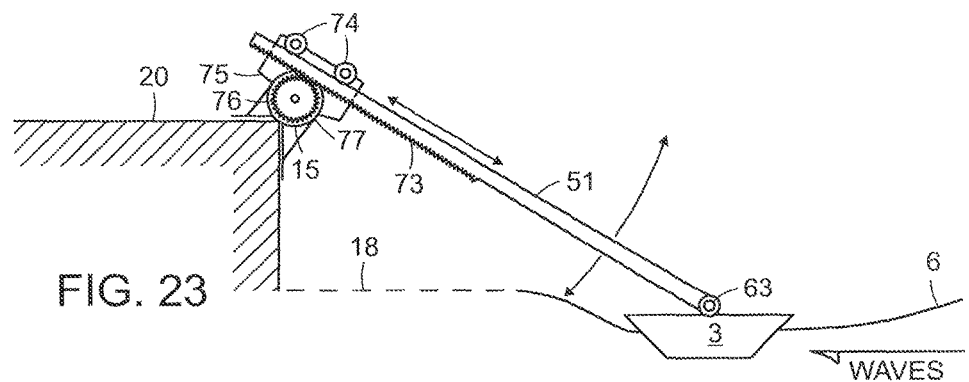
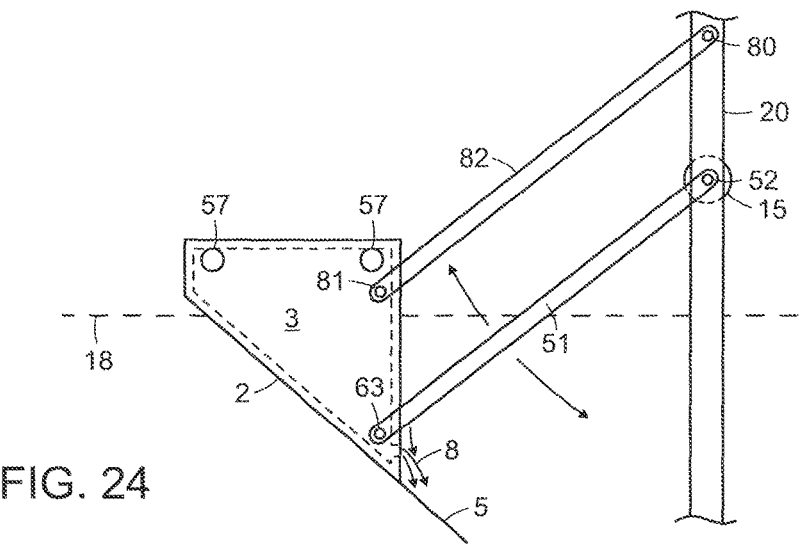

WAVE ENERGY CONVERTER WITH CONCURRENT MULTI-DIRECTIONAL ENERGY ABSORPTION

CROSS-REFERENCE TO RELATED APPLICATIONS

This is a Continuation-In-Part of U.S. Regular Utility application Ser. No. 14/101,325 filed Dec. 9, 2013, which is a Continuation-In-Part of U.S. Regular Utility application Ser. No. 13/506,680 filed May 8, 2012, now U.S. Pat. No. 8,614,520 and claims the benefit of U.S. Provisional Application Ser. No. 61/996,338 filed May 5, 2014, the contents all of which are incorporated in their entirety herein by reference.

FIELD OF THE DISCLOSURE

This disclosure relates to the production of electrical power, pressurized water, or other useful work from surface waves on a water body. More particularly, this disclosure relates to Wave Energy Converters ("WEC") of the wave terminator or barrier type, wherein one or more elongated buoyant surface floats or bodies, or groups of adjacent floats or bodies are oriented, or self-orienting, parallel to the prevailing direction of oncoming wave fronts or swells.

The disclosure relates primarily to WECs having one or more floats or bodies linked or connected by one or more swing arms or other mechanical linkages to one or more stationary or stabilized bodies, frames, or seabed or shore attachment points. Such linkages drive a power take off (PTO) and are arranged in such a manner that the buoyant floats or bodies can rotate and/or translate about the attachment points, or concurrently move in more than one axis or direction of motion to thereby allow the WEC to absorb and capture additional heave (vertical), surge (lateral) and or pitch (rotational) wave energy from such multi-axis or multi-direction motion.

To avoid potentially damaging broadside impacts from extreme waves during severe sea conditions, or to optimize performance, the elongated and wave front parallel floats or bodies of several embodiments of the disclosure can be partially or fully submerged during severe sea conditions. Such float submergence, and re-emergence, can be facilitated by any of several means including forcing float submergence by utilizing the WEC's PTOs (in reverse), by use of auxiliary drives to force float submergence, or by altering the submerged depth of the stabilized bodies or frames or their attachment points to force submergence of the floats under the still water line, or under oncoming wave troughs, until severe seas subside.

BACKGROUND OF THE DISCLOSURE

Ocean wave energy in most northern and southern global latitudes is several times more concentrated than solar energy, or the surface winds that produce ocean waves. Ocean waves are also more consistent and predictable than wind energy and should, therefore, ultimately result in a lower cost of renewable power. Yet ocean wave energy technical development and commercial deployment lags substantially behind wind (including offshore wind) and solar energy. This is in large part due to the proliferation of possible and proposed methods of converting wave energy into power that has diffused public and private efforts so as to limit resources available to the few WEC concepts that may prove to be both affordable, effective and survivable.

Many WEC concepts utilize circular-section buoy-type surface floats reacting against either a central motion-stabilized vertical spar (called "heave-only buoys" or "spar buoys" including the PowerBuoy and WaveBob WECs), or a seabed affixed tensioned cable. These circular-section buoy-type WECs were initially popular because circular navigation buoys have proven to survive in extreme seas and because early university wave tank experiments using buoy-type "point absorber" WECs showed high capture efficiencies when conditions of "resonance" (matching WEC moving mass to a specific wave amplitude and period) were achieved using wave-tank-generated artificially uniform amplitude and period waves. Point absorber type WEC performance in real random ocean wave environments where "resonance" conditions cannot be established or maintained has been extremely disappointing with wave energy capture efficiencies typically less than ⅓ of that achieved in wave tanks. Because these circular floats move/translate primarily vertically, they are often referred to as "heave only buoys" and capture little or none of the surge (lateral) wave-only component.

During the late 1980's, Salter and others at the University of Edinburgh proposed a spar buoy having a sloped or inclined spar called the "Sloped IPS Buoy". This design permitted the buoy or float to move along the spar in both an upward and a rearward motion relative to incoming wave crests and return forward and downward on ensuing wave troughs. Wave tank tests published in 1999 by University of Edinburgh doctoral candidate Chia-Po Lin established that this sloped-motion-constrained buoy or float captured both substantial heave and surge wave energy components even in random wave conditions when the spar was maintained in a fixed sloped position via attachment to the tank bottom.

Other early WEC concepts utilize two or more hinged articulating rafts pointed into (transverse to) oncoming wave fronts including the Pelamis, Cockerell Raft, McCabe Wave Pump, and more recently the Crestwing and Columbia Stingray. These "articulating" type WECs have two or more surface floats or rafts hinged at or near the sea surface (Still Water Line or "SWL") preventing significant lateral float translation or movement and hence limited surge (lateral) wave energy capture. The portion of adjacent rafts or floats near the common hinge joint also limits vertical movement of these portions, which reduces "heave" wave energy capture.

The "elongated swing arms" or "dual swing arms" or "compound motion arms" that float relative to fixed or stabilized frame linkages of the disclosure substantially improve the performance of all "articulating raft" type WECs. The disclosure improves both heave wave energy capture (by allowing more vertical movement/translation near the float/raft surface hinge) more surge (lateral) wave energy capture by increasing lateral float, raft movement, or translation.

Other early concepts, called oscillating water columns or OWCs, use shore attached, or off-shore floating artificial sea caves with air turbine equipped blow holes (OceanLinx). "Articulating raft" and OWC type WECs require large horizontal plane surface areas per unit of intercepted wave front width that increases WEC vessel volume, mass and hence capital costs. Another downside to these designs is that they primarily capture only "heave" or vertical component wave energy (only 50% of total wave energy in deep water). Point-absorber, buoy-type, and other "surface-area-dependent" WECs also have extremely poor (actually negative) economies of scale. When their capture widths are doubled to intercept twice the energy containing wave front, their volumes, weights, and hence costs are tripled increasing rather than decreasing their capital cost per kilowatt captured.

While several early WEC concepts (including the early Salter Duck of the University of Edinburgh) did propose the use of elongated floats, or groups of adjacent floats, oriented parallel to (facing) wave fronts to intercept and capture more wave energy per unit float width, volume, and cost, few wave front parallel "wave barrier" or "wave terminator" type WECs are currently being pursued. This is primarily due to their severe sea survival vulnerabilities. One notable exception are "surge flap" type WECs that use a buoyant, vertically oriented (in still water) elongated flap or panel, hinged at its base that rotates about the hinge in response to lateral (surge) wave forces. This design is currently being developed by Aquamarine, Resolute, Langlee and others. Most "surge flap" WECs are of fixed orientation (toward the prevailing wave front direction), hinged at or near the seabed, in near-shore locations having less than 20 meters water depth (except for the Langlee design that uses two parallel buoyant flaps hinged to a semi-submerged frame).

The "single elongated arm", "dual swing arm" or "compound-motion swing arm" float-to-frame linkages of the disclosure substantially improve the performance of all "surge flap" type WECs in two ways. The first is to improve the flap's surge wave energy capture effectiveness by allowing the lower portion of the flap (near the fixed bottom hinge) to move laterally. The second improvement is to enable the buoyant flaps to also capture substantial heave (vertical component) wave energy by allowing increased concurrent horizontal and vertical flap movement or translation.

It is most desirable to have WECs with floating bodies operate on the ocean surface in deep water (offshore) where the wave energy resource is greatest and siting conflicts are minimized. WECs with elongated surface floats oriented parallel to wave fronts can intercept and potentially absorb several times more wave energy per cubic meter of float volume, weight, and cost. Few WECs of this type have been proposed or pursued to date, however, because WECs with elongated surface floats oriented parallel to wave fronts must survive broadside impacts against these surface floats from storm waves that can reach 15 meters height. Several proposed WECs operate fully submerged using only wave induced hydrostatic pressure fluctuations. They are deployed either on the seabed (M3), or substantially below the surface (CETO and AWS II), but wave energy, predominantly a surface phenomenon, decreases exponentially with depth. Thus, subsurface deployed WECs can only access the heave wave energy component (only 50% of total wave energy at the surface), which results in low wave energy capture efficiencies.

Many embodiments of the disclosure overcome the survival limitations of prior elongated float, surface deployed WECs by using various methods to totally submerge the floats during severe sea conditions including those described and claimed in my U.S. Pat. No. 8,614,520 and in my prior regular utility application Ser. No. 14/101,325, of which this application is a Continuation-In-Part. The present disclosure also describes and claims several ways to link the wave front parallel oriented elongated floats to stabilizing frames or structures and WEC Power-Take-Off (PTO) systems in ways that increase the wave induced horizontal, vertical and/or rotational translation of such surface floats and, therefore, their wave energy capture efficiency.

SUMMARY OF THE DISCLOSURE

The WEC embodiments of the disclosure utilize one or more elongated, relatively light-weight and, therefore, highly responsive and low cost, self-orienting wave-front parallel surface floats or multiple adjacent floats. Elongated floats minimize float volume and hence WEC cost per meter of intercepted wave front. The axis of movement of the single elongated, or multiple adjacent floats is dictated by the rotating "swing arm" and/or translating attachment linkages between the float(s) and the stabilized or stationary frame, or other stabilizing attachment point(s).

The attachment linkages or mechanisms disclosed in U.S. Pat. No. 8,614,520, incorporated herein by reference, describe a single direction of movement or axis of rotation of the one or more floats (down sloped linear movement for the embodiment with tracks or down sloped arcuate rotation for the embodiment with swing arms). This down sloped movement allows these WECs to capture a majority (but not all) of both heave (vertical component) and surge (horizontal component) wave energy. The theoretical maximum amount of wave energy capture for the heave and surge wave energy components at any instant for either linear or arcuate down sloped motion of the float is equal to the sine (for vertical heave) plus cosine (for lateral surge) of the slope angle (from horizontal), respectively. For a constant downward sloping slope angle of 45 degrees, for example, in deep water, where heave and surge wave energy are each exactly 50% of total wave energy, the theoretical capture limits are maximized with 0.707 of total heave energy plus 0.707 of total surge energy and, therefore, a maximum of 70.7% of total wave energy. For a slope angle of 30 degrees the theoretical maximum capture efficiency is 68.3% or (0.866+0.50)/2=0.683. Capture efficiencies above these theoretical maximums are possible in wide wave tanks using uniform waves and conditions of "resonance" producing a wave focusing "antenna effect" but this is not achievable in real open ocean random waves.

It is most advantageous to allow the direction of movement and/or axis of rotation of the one or more elongated wave front parallel surface float(s) of the present disclosure to theoretically capture 100% of the available heave energy and 100% of available surge energy (without the benefit of artificially induced wave tank conditions of resonance). This is done in the present disclosure by selecting mechanical linkages between the elongated float(s), (or multiple adjacent floats forming an elongated float group) and the frame or other fixed or motion-stabilized reaction body (through the Power-Take-Off or PTO) to concurrently and independently allow the floats to move both vertically (for full or increased heave capture) and horizontally (for full or increased surge capture) relative to the frame, tower, or other stabilized reaction body. Heave and surge wave energy for each float, in most embodiments, are each captured with their own independent PTOs or generators. In some embodiments, however, they can be combined to use a single PTO or generator.

FIG. 15 (which is FIG. 10 in prior application Ser. No. 14/101,325) and FIG. 16 of this disclosure show embodiments of the present disclosure where concurrent and independent vertical and lateral translation (FIG. 15) or lateral and rotational translation (FIG. 16) of the float(s) is obtained. It is generally less expensive and more reliable, however, in ocean environments to mount WEC surface floats on swing arms rather than linear tracks. The slope angle and, therefore, theoretical maximum capture efficiency for a float vessel supported by swing arms pivoting around a submerged pivot point (rather than a float on constant slope angle tracks) is constantly changing, but does not deviate much between +/−20 degrees from the ideal 45 degrees (if long swing arms are used), and will still average around 70% capture efficiency over this swing arc.

The one or more elongated buoys of the present disclosure can be hollow or foam filled and fabricated with fiber reinforced plastics (FRP) or composites, metals (aluminum or steel), or similar materials. Where hollow floats or floats with internal cavities are used, it is useful to have either open upper cavities (like a boat hull) or apertures allowing seawater ballast to controllably enter or exit the cavities providing supplemental float mass to enhance wave energy capture efficiency during certain sea conditions. These structures are also advantageous to reduce the float's buoyancy, which must be overcome by the WEC's PTOs, alternative float submerging drives, or the attached submergible frame, to fully submerge the elongated floats during severe sea states.

In some embodiments of the present disclosure, the one or more floats are elongated with a horizontal plane (defined as the width of a single float, or the combined width of two or more adjacent floats) oriented parallel to oncoming wave fronts, substantially exceeding their fore to aft horizontal depth (excluding any fore or aft appendages). In some embodiments the float have a substantially upward or vertically oriented flat or curvilinear wave impacting forward face, substantially self-orienting or oriented parallel to prevailing or oncoming wave fronts. A portion of the wave impacting forward face is generally below the water surface (in still water) and optionally has a lower lip or extension plate protruding generally forward of, and/or downward from, the forward face of the float(s).

The one or more floats of the present disclosure are mechanically linked to a motion-stabilized or fixed-position frame, driving one or more PTO's (or generators), or directly or indirectly attached to the seabed, shoreline, or an offshore-submerged or above-surface tower, piling, or surface vessel. The PTOs can be located at either the float end or stabilized frame end of the mechanical linkages. In some embodiments, the PTO is comprised of a direct or indirect (including gearbox, rack and pinion, linear helix or ball screw, chain, gear belt and capstan cable) driven rotary electric generator (advantageously having high torque at low RPM), or a linear electric generator. Alternatively the PTO(s) can be comprised of high or low pressure hydraulic motor or turbine-driven generators with or without fluid accumulators to smooth wave to wave output surges. The PTOs should include the ability to control the multi-directional or multi-axis resistive forces applied by the float(s) against oncoming waves throughout each power stroke (in one or both directions) during each wave cycle including slowing or delaying the initial float motion during each power stroke until an optimal resistive force for that individual or average wave type has been reached (commonly referred to as "latching"). This can be accomplished by sensing the amplitude and velocity of each oncoming wave in advance of its reaching the floats and optimizing, via a programmable controller, the generator torque or resistive force to be applied by the float(s) to that wave (or average of several waves). A "latching brake" can assist the generator with supplemental resistive torque or force, if needed.

The mechanical linkage of the present disclosure between the one or more floats and the motion stabilizing frame or attachment points is comprised of one or more combinations of rotating swing arms, fixed or variable length drive bars or arms, linear or curvilinear tracks or gear racks, or drive cables, chains, belts or gears. The linkages between the floats and the PTOs are chosen and arranged such that the float(s) movement concurrently or independently in vertical, horizontal, and/or rotational directions, in response to wave-induced forces upon them, is substantially increased and/or the float's rotational orientation and wave impacting face angle is optimally maintained or controlled independent of the float's arc or direction of motion.

The stabilized frame or other motion stabilized attachment points to which the swing arms of the present disclosure are attached can be comprised of, or attached to and stabilized by, a simple single seabed affixed pole or monopile (either subsurface or protruding above the surface), (where water depths allow (generally below 50 meters)), an offshore seabed affixed or floating tower or platform, a seawall, or a motion-stabilized floating frame or vessel.

When attachment is to a seabed or shoreline frame or stabilized body, it is desirable to have either the attachment point or the mechanical linkage adjustable for tidal depth changes to maintain high wave energy capture efficiency and to have the attachment points allow the float(s) to rotate in a horizontal plane about a vertical axis to maintain their wave front parallel orientation relative to oncoming wave fronts. Means for stabilizing floating frames against wave heave, surge, and pitch forces and for controlling the submerged depth of floating frames to enhance WEC performance or to submerge the elongated floats during severe sea conditions are described in my U.S. Pat. No. 8,614,520 and its Continuation-In Part (CIP), application Ser. No. 14/101,325, of which this is application is a CIP and which are incorporated herein by reference.

The present disclosure can also utilize the wave focusing and shoaling means described in U.S. Pat. No. 8,614,520 and it's CIP application Ser. No. 14/101,325. Such means include a down sloping shoaling plane affixed to either the floating frame or other stabilizing body. Alternatively or in addition, the protruding downward forward lip attached to the bottom of the wave impacting forward face of the floats also captures and focuses upward additional kinetic wave energy found deeper in the water column.

While the subject disclosure can be pre-oriented by attachment to fixed structures, or moored such that it's elongated float(s) are parallel to the prevailing wave front direction, it is advantageous for the WEC of the present disclosure to be self-orienting, maintaining its parallel orientation to oncoming wave fronts as they change direction from time to time. This is especially desirable with WECs using one or more elongated floats, like the present disclosure where the wave front facing horizontal plane (defined hereinabove) is substantially greater than their fore to aft horizontal depth.

The subject disclosure is advantageously self-orientating such that its float(s) are maintained approximately parallel to oncoming wave fronts by establishing a single up sea pivoting attachment point above or below the still water line or SWL, forward of the point where oncoming waves exert their lateral or surge forces upon the one or more floats and frame. This can be accomplished by having at least two mooring cables attached to opposing ends of the WEC frame (outboard of the float(s) converging at a single surface or submerged mooring buoy or point (ref. U.S. Pat. No. 8,614,520 FIG. 13). Alternatively, rigid mounting arms on opposing sides of the WEC frame, or shoaling planes or other appendages thereto, can converge at a single pivot point such as a vertical mono-pile or column (U.S. Pat. No. 8,614,520 FIG. 5 element 35) allowing horizontal rotation. Controlled underwater vertical planes, foils, or rudders can be used, as necessary, to offset the miss-orienting effects of any sub-surface currents or surface winds on the WEC. It is desirable to also have any rigid mounting arm attachments at either both ends of the WEC and/or the pivot point, to allow the arms to pivot or slide up and down vertically to accommodate tidal changes in the depth of the Still Water Line (SWL).

DISTINGUISHING FEATURES OVER THE PRIOR ART

One currently popular generic WEC configuration is the buoyant "surge flap". FIG. 1 illustrates the Oyster, a surge flap WEC being developed by Aquamarine of Scotland. Buoyant surge flap WECs are also being developed by Resolute Energy (US) and Langlee of Norway (FIG. 2) among others. Surge flaps are normally deployed on the seabed near shore in shallow water (10-15 meter depth) because they usually pump pressurized water through seabed hoses to shore based conventional small hydroelectric PTO systems and because they primarily capture only the surge wave energy component which predominates in shallow water. Near shore the seabed has diminished/absorbed most of the heave wave energy component or converted the remainder to surge component. Langlee, however, is a floating deep water deployable WEC using two parallel buoyant surge flaps hinged to a submerged frame directly driving (through a gearbox) a generator. Buoyant surge flaps are only moderately effective at capturing the surge wave energy component because their single rotational axis of motion (rotation about their stationary base hinge) makes the flaps too resistive to wave induced lateral (surge) motion near their stationary hinged base and too compliant (due to leverage) at the buoyant flap top. Additionally, they are almost totally ineffective at capturing the heave wave energy component, which is 50% of total wave energy in "deep water" (depths exceeding ½ wavelength), because their single rotational axis of motion allows almost no heave or buoyancy-induced vertical translation of the flap above the stationary bottom hinge.

FIGS. 11-14 disclose a means to substantially improve the wave energy capture efficiency of prior art surge flaps. These embodiments of the present disclosure employ "dual swing arms" (pairs) to improve the performance of surge flaps. FIG. 11 applies the "dual swing arms" of FIG. 10 (FIG. 11 in application Ser. No. 14/101,325) of the present disclosure to the prior art surge flaps referenced above (either seabed mounted or offshore floating frame mounted types). Both absorb heave and surge wave energy in several ways. Firstly, because the flap now remains generally vertical (or can be forward or rearward sloping depending on the relative length and relative orientation angle of the dual swing arms 51 and 82), the lateral wave surge forces can translate the bottom of the flap approximately as far as the top capturing more surge wave energy. Secondly, this dual swing arm arrangement produces greater rotational translation of the arms about their lower arm pivot points 52 for the same top of flap lateral translation resulting in additional energy capture and a higher angular velocity of any gear or direct driven generator or other type of PTO (at 15 or 77 in FIG. 8D) driven from this rotation, for better energy generation or PTO utilization (lower cost and/or higher efficiency).

This multi-axis rotation of dual swing arms also allows vertical translation of the buoyant flap providing more heave capture (and more surge capture as the flap intercepts more vertical surge area) especially when the flap center of buoyancy, in its neutral or SWL position, is forward of the frame dual pivot points (per FIGS. 12-14). Utilizing the dual swing arms 51 and 82 of the present disclosure also allows a WEC using them to be deployed deeper into the water column (or in deeper water) by simply utilizing longer (or variable length) arms that also provide added leverage (torque) to the PTO drive for added energy capture. Additional water column depth and surge area can be obtained by adding extension plates protruding from the flap bottom 5, or flap top (not shown).

In FIG. 12, dual swing arms of the present disclosure maintain a generic buoyant surge flap 3 in an advantageous vertical orientation while drive bars 70 on the sides of float 3 having gear teeth drive PTO or generator 77, located either in flap 3 (shown) or within or attached to frame 20 (not shown). This configuration allows concurrent and independent vertical translation of float 3 to capture the wave heave energy component while the PTO or generator 15 captures the lateral or surge wave energy. Prior art bottom hinged "surge flap" WECs capture little or no heave (vertical component) wave energy.

While the buoyant flap 3 and its dual swing arms 51 and 81 can have a vertically neutral (still water line or "SWL") position like prior art surge flaps, under the present disclosure it is advantageous, especially in deeper water where heave and surge wave energy components are more nearly equal, to have the neutral SWL position angled or biased forward toward oncoming wave fronts (advantageously around 45 degrees) to allow the flap to maximize capture of both heave and surge. WECs using elongated floats on swing arms hinged to stabilizing bodies or frames at points "substantially below the water line" and oriented or biased forward toward oncoming waves (in their neutral SWL position) are a part of the present disclosure and were first disclosed in my U.S. Pat. No. 8,614,520 and my application Ser. No. 14/101,325.

In FIG. 13 as in FIGS. 11 and 12, the buoyant float or flap can be biased to a forward neutral SWL position relative to hinges 52 and 80 either by using counter weights 66 on arm 67 (per FIG. 13), by adjusting the submerged depth of the floating or seabed affixed frame or arm attachment points (52 and 80), or by applying a forward rotation force to the arms supplied either by the PTO system (operating in reverse) or a supplemental mechanical drive (not shown). Wave induced float or flap rotational oscillation about the forward tilting neutral (at SWL) swing arm angle of the present disclosure will provide a higher combined heave and surge wave energy capture efficiency than oscillation about either the vertical or horizontal tilting center of oscillation of the prior art because it provides more combined vertical and horizontal translation and, therefore, more combined heave and surge wave energy component capture. The elongated swing arms and dual arm or "compound swing arms" (allowing concurrent rotation and translation) of the present disclosure further enhances wave-induced float translation and efficient wave energy capture.

FIGS. 15 and 16 show alternative ways to use the present disclosure to improve the performance of generic "surge flap" type WECs by using either two pairs of "compound or linear motion arms" on the ends of float 3 and laterally from frame 20 (FIG. 15 elements 70 and 72), or one pair of "compound motion arms" (FIG. 16 element 72) allowing the bottom surge flap hinge point to translate vertically.

In FIG. 15, the lower ends of buoyant flap or float 3 are rigidly attached to members 70 with integral or affixed gear racks 71 engaged with PTO or generator 77 drive gear 76 and idler pulleys 74 such that the buoyant flap is also permitted to independently and concurrently translate approximately vertically in response to the buoyant or heave forces acting upon the float. This vertical wave-heave-force-induced translation is resisted, controlled, and captured by secondary PTO device 77. Wave surge or lateral induced forces on flap/float 3 are resisted, controlled and captured by primary PTO 15 driven by lateral member 72 with gear rack 73 through pinion 13. PTOs 15 and 77 can be rotary electric, hydraulic, linear, or magneto-restrictive electric.

FIGS. 3 and 4 depict prior art articulating raft or float type WECs by McCabe, and Dexawave, respectively. McCabe utilizes fore (bow) and aft floating rafts (pontoons) hinged to a center reaction mass. McCabe's reaction mass uses seawater entrapped by at least one submerged horizontal drag plate. The Dexawave WEC (FIG. 4) utilizes hinged rafts made of fore and aft elongated parallel floats, but with no center reaction mass. Other prior art articulating float WECs like the Cockerell Raft and the Pelamis use three or more rafts without a reaction mass between them. The Columbia Power StingRay (FIG. 5) combines the floats on arms of the Dexawave WEC with the central drag plate reaction mass of McCabe and substitutes a direct drive rotary PTO generator for McCabe's hydraulic PTO. None of the prior art articulating raft or float WECs use the connecting arms of the present disclosure with pivot points submerged substantially below the SWL (FIGS. 8 through 21), or substantially above the SWL (FIGS. 22-24).

Generic articulating raft type WECs including those referenced above have several serious wave energy capture efficiency limitations that can be overcome by the "dual swing arm" multi-axis rotation, the "compound swing arm" multi-directional motion, and the location of swing arm pivot points substantially above or below the SWL of the present disclosure. Articulating float or raft WECs depend on the wave-induced relative motion (rotation) of their floats about their hinge joints to drive their hydraulic or electric PTOs. Because typical wave lengths of ocean waves or swells are long (60-180 meters) relative to their wave or swell amplitudes (1-6 meters), the angles of relative rotation produced about their hinge joints (located at or near the SWL) of articulating rafts available to drive the articulating WEC PTO are very small requiring lots of gearing or inefficient partial rotor rotation of a direct drive generator PTO. Like the vertically oriented bottom hinged buoyant surge flap previously described, and because their rafts or floats are hinged at or near the water surface, these horizontal plane articulating rafts or floats are too resistive to vertical (heave) wave forces near their surface hinges and too compliant at raft or float locations remote from their hinges. Dexawave and more recently the Columbia StingRay use floats or rafts extended from their hinge joints by lever arms to span more wave length, but rafts or spans of ½ the average expected ocean wave length would be prohibitively costly and impractical to build.

A more serious limitation of articulating floats or rafts, however, is the inability of the rafts or floats to significantly translate horizontally or laterally, which is necessary to capture the surge or lateral component of wave energy. This is so because their hinge joint axis is located at or near the water surface. My Rohrer U.S. Pat. No. 8,614,520 and application Ser. No. 14/101,325 (FIG. 8), of which this disclosure is a continuation, disclose and claim one or more elongated wave front parallel floats connected to lever arms that pivot about a stabilized point "substantially below the water line" allowing the floats to move in a sloped or arcuate direction "upward and rearward" during wave crests and then "downward and forward during subsequent wave troughs" to capture a majority of both heave and surge wave energy components. The present disclosure further improves the concurrent capture of heave and surge wave energy by mechanically linking one or more floats with the "dual swing arms" and/or "compound motion swing arms" to allow additional wave-induced concurrent and independent horizontal, vertical, and rotational float translation with energy capture by the same or multiple PTOs.

By allowing the fore float(s) of the present disclosure to move or translate concurrently vertically, horizontally, and in some embodiments, rotationally, for heave, surge, and pitch energy capture, respectively, the present disclosure can eliminate the need for, and cost of, the aft float of the Columbia StingRay (or Dexawave) designs and their additional PTOs that capture a substantially smaller portion of the oncoming wave energy not absorbed or reflected by the fore float. The near surface hinge joints of the Stingray front and rear floats and the short arm length of the front float also reduces wave energy capture effectiveness. The near and above surface portion of the center reaction mass of the StingRay (that houses the front and rear PTO), further masks and reflects waves forward preventing them from reaching the rear float. The primary purpose of the rear float of the Stingray (and the rear float shown in FIGS. 8 and 9 of the present disclosure) is to provide enhanced pitch stabilization that increases the rotational translation and energy capture of the fore float. The rear float, however, may provide even more pitch stabilization, if it is maintained at a fixed position relative to the reaction mass or frame thereby eliminating the need and cost of a second PTO.

If there is sufficient wave energy escaping capture by an elongated wave front parallel fore float to justify the expense and added WEC complexity of supplemental capture by an aft float (oriented parallel to and rearward of the fore float), the configurations of FIGS. 17 and 18 and FIGS. 19 and 20 of the disclosure will capture it more efficiently than prior art articulating raft type WECs with hinged joints at or near the water surface. In FIGS. 17 and 18, both floats (3 and 3') use the "compound motion swing arms" (FIG. 17), or the "dual swing arms" (FIG. 18) of the present disclosure to rotate about separate submerged hinge points (52 and 52') spaced horizontally apart, to provide the downward sloped notion of both floats (upward and rearward on wave crests and downward and forward on troughs), and to allow concurrent multi-axis rotation or multi-directional translation and energy absorption.

FIG. 19 describes an alternative fore and aft float arrangement of the present disclosure with the fore float following the more advantageous sloped path due to its hinge point being substantially submerged below the water line and rearward of its float as previously described. The aft float swing arm pivot point 52' could be elevated substantially above the SWL allowing sloped movement of float 3' for improved capture efficiency. Both floats use utilize the variable length "compound motion swing arms" of the present disclosure to increase translation and further enhance capture efficiency. FIG. 20 uses the same forward float and "compound motion swing arms" as FIG. 19, but also uses the "dual swing arms (FIG. 24) with stabilizing frame arm pivot points 52 and 80 substantially above the SWL allowing float 3' to also enjoy the enhanced efficiency of sloped arcuate motion.

FIG. 21 shows an embodiment of the present disclosure where one or more (two shown) elongated floats or buoyant foils rotate about a common horizontal axis, like the Atargis WEC of FIG. 7 (that uses a horizontal axis Voith-Schneider cycloidal ship propeller), but where the cycloidal axis of rotation 99 is on either the fixed or variable length "compound motion swing arms" of the present disclosure driving separate or common PTOs as previously described, thus enhancing the wave energy capture efficiency vs. a fixed axis horizontal Voith-Schneider or Atargis type rotor. Unlike the FIG. 7 Atargis, the cycloidal rotor of the present disclosure also has a rotor diameter which can be controlled by moving variable length rotor arms 95 inward or outward. Foil pitch is controlled by pitch control rods or cables 96. The Voith-Schneider propellers have low hydrodynamic efficiency and are used only in low speed service ship applications where their improved ship maneuverability is advantageous. Their intrinsic low efficiency is due to only a portion of their controlled pitch foils providing thrust while the others are producing drag until they return to their starting thrust position. When the Voith Schneider type cycloidal rotors are used in WECs, their wave energy capture efficiency is highly dependent upon matching rotor diameter to wave amplitude that varies wave to wave and day to day.

Related art including Packer (U.S. Pat. No. 4,295,800), Dullaway (U.S. Pat. No. 8,536,724), and the Wave Star of Denmark, all describe WECs utilizing round or elongated floats with arcuate motion dictated by swing arms of constant length pivoting about a point or horizontal axis substantially above the still or mean water line rather than below the SWL per previously described embodiments of the present disclosure, or at the SWL per Columbia, McCabe, Cockerell and others. Their floats are lifted out of the water for survival during severe sea conditions rather than submerged per previously described embodiments of the present disclosure.

Utilization of the "compound" variable length arms or dual arms of the present disclosure can substantially increase wave energy capture efficiency of floats on swing arms pivoting about a point substantially above the SWL by allowing increased concurrent vertical and lateral float displacement during each wave cycle as depicted in FIGS. 22-24. In FIG. 22, a float located below and rearward of its swing arm pivot point 52 (like Dullaway) swings upward and rearward in response to oncoming wave crests. By utilizing the variable length "compound swing arm" of the present disclosure driving a common 77 or supplemental PTO (not shown), additional arm rotation and horizontal and vertical float translation occurs resulting in additional energy capture.

In FIG. 23, a float below and forward of its connecting lever arm pivot point 52 (like the Wave Star) likewise obtains additional lever arm rotation and float translation and energy capture utilizing one or more (or pairs of variable length "compound swing arms" of the present disclosure. Without the "compound swing arms" of the present disclosure, floats extending on swing arms toward oncoming wave fronts from seawalls or piers have virtually no lateral translation from oncoming wave front lateral surge forces and hence minimal surge wave energy capture ability.

In FIG. 24, a float is rearward of one or both of the swing arm pivot points of its two, approximately parallel, "dual swing arms". This maintains or controls the float's orientation (preventing float rotation) during its travel allowing the float with any appendages to maintain a deeper penetration into the water column and optimal front face wave impact angle for more surge and heave energy capture during its wave induced translations. The embodiments of the present disclosure shown in FIGS. 22-24 can be applied to elongated or other floats that are submerged under, lifted above, or maintained in the water during severe wave conditions.

BRIEF DESCRIPTION OF THE DRAWINGS

FIG. 6 is a submerged bottom isometric view of a related art WEC by Atargis.

FIG. 7 is a submerged bottom isometric view of the related art WEC shown in FIG. 6 with attached sensors and actuation control.

FIG. 22 is a view in elevation of a WEC with a float trailing above a surface pivot point "compound motion swing arms" according to another embodiment of the disclosure.

FIG. 23 is a view in elevation of a WEC with a float leading above surface hinged leading swing "compound motion swing arms" according to yet another embodiment of the disclosure.

FIG. 24 is a view in elevation of a WEC with float trailing parallel "dual swing arms" with above surface pivot points according to still another embodiment of the disclosure.

It should be understood that similar reference characters denote corresponding features consistently throughout the attached drawings and that similar reference characters with or without prime designations denote corresponding features in different embodiments of the disclosure.

DETAILED DESCRIPTION OF THE DISCLOSURE

Figure 1:
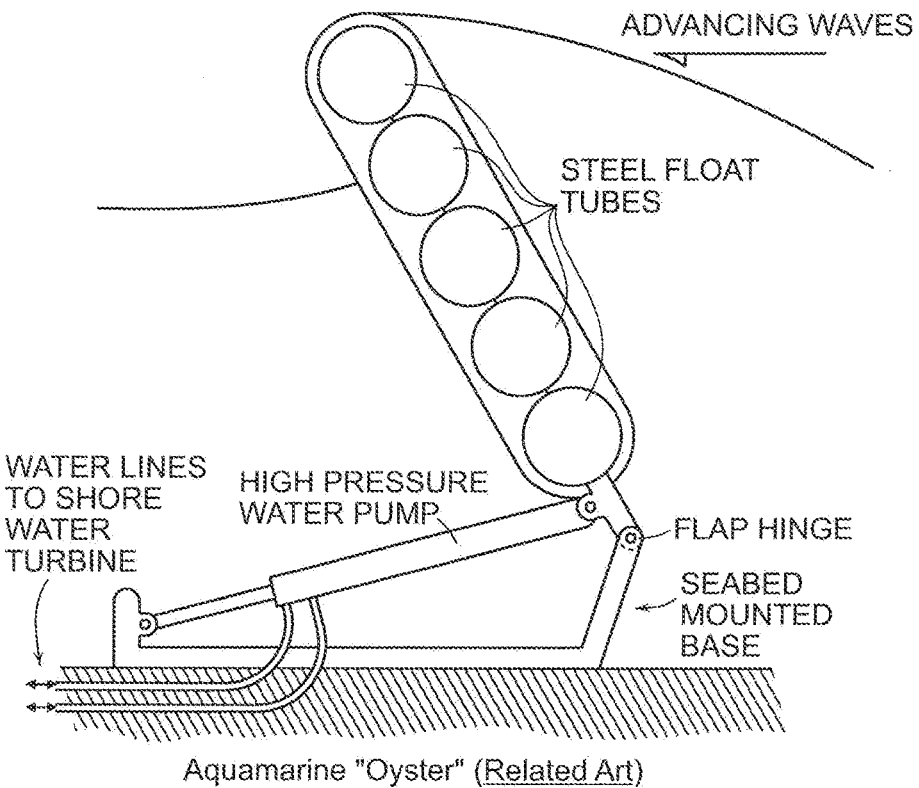
FIG. 1 is a view in elevation of a related art WEC by Aquamarine Oyster.
Figure 2:
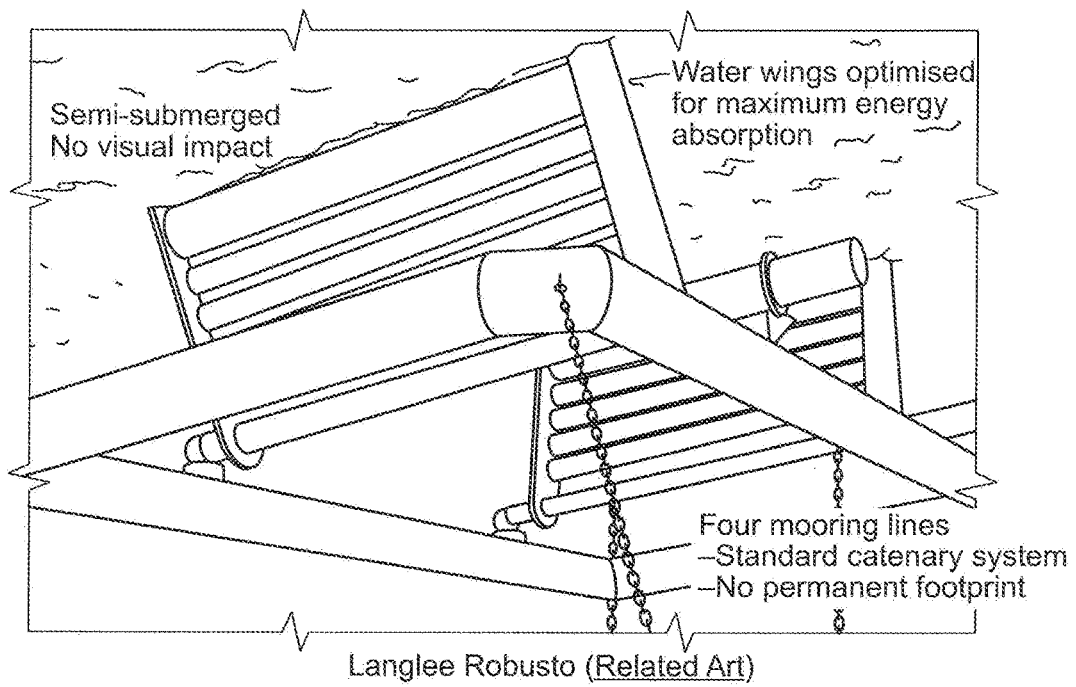
FIG. 2 is a submerged bottom isometric view of a related art WEC by Langlee Robusto.

The features and limitations of the Prior Art WECs of FIG. 1 through FIG. 4, inclusively, are previously described in the previous DISTINGUISHING FEATURES OVER THE PRIOR ART section and in my U.S. Pat. No. 8,614,520 and U.S. application Ser. No. 14/101,325 of which this is a Continuation. The discussions of those related references are referenced here to provide perspective to the following detailed description.

FIG. 6 is an embodiment of the present disclosure similar to FIG. 7 in application Ser. No. 14/101,325 wherein one or more (two shown) elongated buoyant float(s) or barrier(s), 3 and 60, having a wave front facing and impacting forward face which face may be concave (shown as 1 on the fore float 3), flat (shown as 1 on the aft float 60), or convex (not shown) and being rigid (shown), hinged (not shown) or flexible or compliant (not shown). The float(s) bottom 2 can be flat and angled approximately parallel to the float's direction or arc of motion (as in bottom 2 shown in FIGS. 10, 13, 17-20, and others) or arcuate 2 as shown herein to reduce drag and minimize the formation of an energy consuming "back wave" as the float is driven rearward and upward by the lateral surge forces and vertical heave or buoyant forces of oncoming waves 6 impacting face 1. Buoyant floats 3 and 60 can be solid or foam filled (like 60) or hollow (like 3). The float(s) may have an attached protruding lower lip or "shoaling plane" 5 that allows the float to penetrate deeper into the water column capturing additional surge (lateral/kinetic) wave energy. The float(s) and forward face 1 are advantageously pre-oriented toward prevailing wave fronts or self-orienting parallel to oncoming wave fronts 6.

Forward float 3 is rotatably connected by two swing arms 51 on opposite sides of the float to the two vertical spar sections of motion stabilized frame 20 at connection pivot points 52 located substantially below the normal operating Still Water Line or "SWL" 18. Float 3 advantageously, either individually or collectively with adjacent floats, is elongated having a wave-facing front-facing width substantially exceeding its fore to aft depth allowing the float to intercept and capture a maximum amount of energy containing wave front per unit of float volume, weight, and, therefore, cost. Oncoming waves 6 rotate float 3 both rearward (by impacting its forward face 1) and upward (due to the upward buoyant forces of wave 6 on the float). The rearward rotation of float 3 and arm 51 is resisted by bull gear 12 driving pinion gear 13 on primary generator or other PTO 15 (with or without a gear box). Alternatively, a generator 15 can be directly driven (with or without a gear box) by swing arm 51 at pivot point 52. One or more optional pivoting louvers 45 are pivotably mounted on 51 and span the float driven swing or lever arms 51. Their eccentric hinges 46 and return springs (not shown) allow them to rotate flat (parallel to wins 51 when oncoming wave fronts apply surge wave pressure against them and then rotate open (dotted positions) when arms 51 are returning during subsequent wave troughs.

Figure 8:
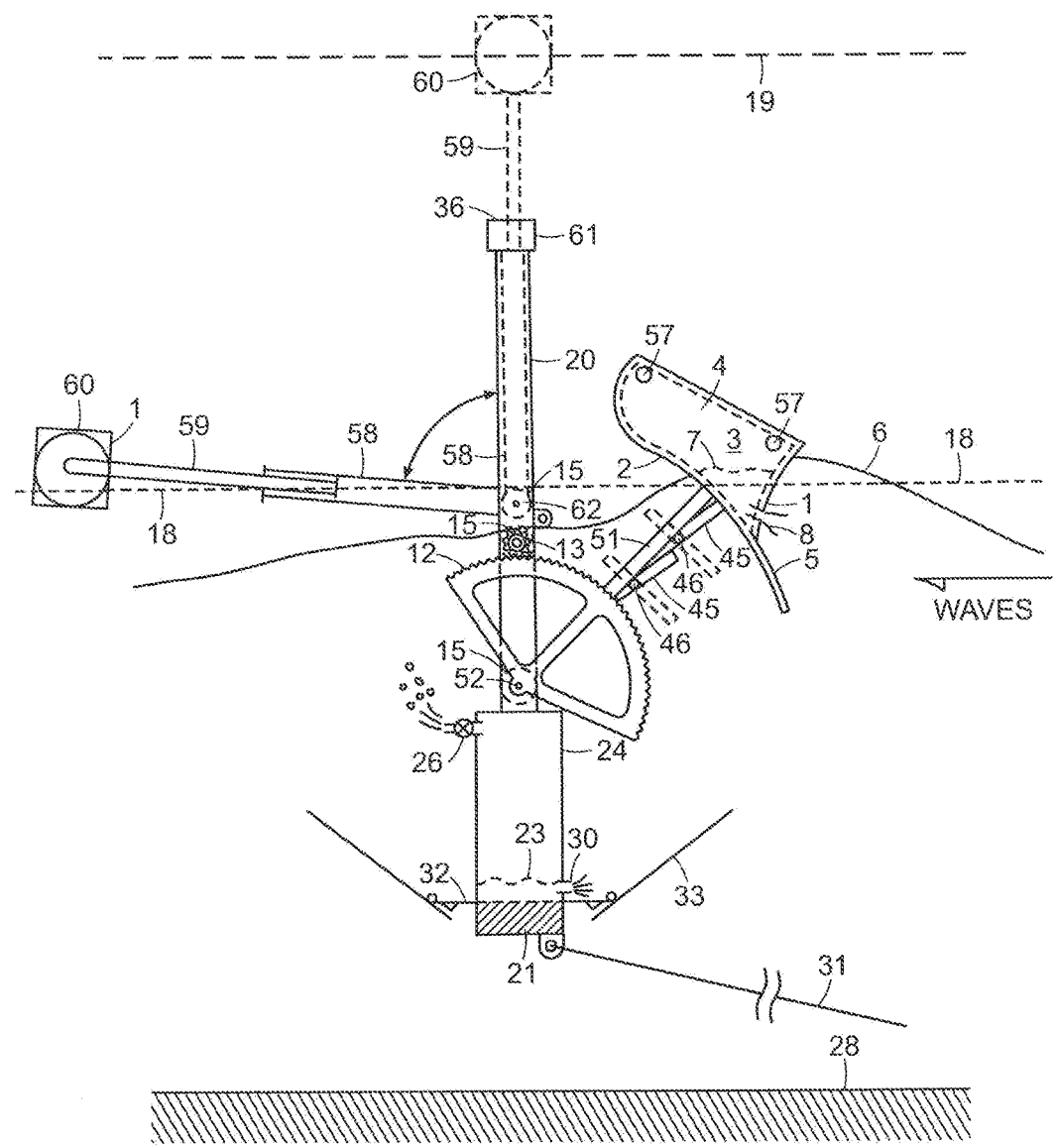
FIG. 8 is a view in elevation of a WEC with a subsurface hinged active fore float and a surface hinged static or active rear float according to one embodiment of the disclosure.

Rearward float 60 is mechanically linked to stabilize frame vertical spars 20 by arm 58 and optional arm extension 59 that can pivot about point 62 located at or near the SWL (as shown in FIG. 8). Total arm length (59 plus 58) can, optionally, be adjustable by allowing 59 to slide within or along 58. The primary function of aft float 60 is to provide pitch stability to frame 20 as both lateral (surge) and vertical (heave) wave forces against float 3 are applied to frame 20 through the resistive torque of generator or other PTO 20 forcing it to rotate/pitch rearward (counterclockwise). If float 60 is used for pitch stability only, arms 58 are locked into a horizontal position approximately normal to vertical frame spars 20 during WEC operation. Alternatively, arm 58 can be free to rotate about hinge points 62 driving generator or other PTO 15 or a secondary generator or PTO (not shown). Float 60 will capture substantially less wave energy than float 3 because (1) float 60 is effectively masked by float 3, and (2) its hinge point 62 is at or near the SWL that does not allow float 60 to translate in the more effective upward and rearward direction with oncoming wave crests. Placing hinge point 62 "substantially above the SWL" 18 (such as at or near frame cross beam 61) while not shown in FIG. 8, would provide a more advantageous embodiment allowing float 60 to move both upward and rearward during oncoming wave crests to capture more surge (lateral) wave energy component (see also FIG. 24).

With almost no lateral movement or translation, float 60 will capture very little surge wave energy component (which is 50% of total wave energy in deep water). If float 60 swing arms 58 are unlocked and it is used for supplemental wave energy capture, it will also provide less pitch stability to frame 20 that will reduce the rotation and hence, wave energy capture by primary float 3 (partially or completely offsetting float 60's supplemental generation). Arms 58 can be unlocked and allowed to swing to a vertical position when the stabilizing frame is submerged during severe sea conditions allowing float 60 to provide sufficient residual buoyancy to prevent float 60 from sinking below SWL 18 when frame ballast tank 24 and primary float 3 are flooded for submergence during severe sea conditions. Primary float 3 arms 61 are so arranged (i. e. inboard) relative to arms 58 such that these arms and their floats do not interfere with each other as they swing through their travel arcs.

Stabilizing frame 20 with its lower seawater adjustable ballast section 24 and fixed high density ballast 21 either alone, or in combination with, floats 3 and 60 have net positive buoyancy. During severe sea conditions, primary forward float 3 can be fully submerged below oncoming wave troughs for protection either by controllably flooding lower frame section 24 with seawater 23 through ports 30 by releasing compressed air in the upper portion of frame section 24, or forcing float 3 into submergence either using PTO or generator 15 in reverse or using a supplemental drive rotating arms 51 downward. A hollow interior cavity 4 of float 3 can be controllably partially filled (to level 7) with seawater through controlled apertures 57 to adjust float mass for optimized wave energy capture efficiency for a given sea state or completely filled to reduce or eliminate float 3 buoyancy to facilitate its total submergence. The buoyancy of float 3 can be re-established by raising float 3 with PTO or generator 15 or an alternative drive (not shown) allowing seawater to exit through controllable or one-way drains 8. The frame's adjustable buoyancy level can also be used to establish the optimal rotational arc of travel of arms 51 for maximum energy capture efficiency for a given operational sea state.

Drag plate extensions 33 provide heave stability to the frame and may be hinged at their connection to horizontal drag plates 32 for reduced drag when recovering downward during wave troughs. The drag plates and their extensions may extend between the twin frame vertical spar members 20 and 24. The frame may have additional cross members 61 to maintain rigidity between the vertical frame spar members. Mooring cables 31 that converge at a single up-sea pivoting point (mooring buoy, vertical piling or the like, not shown) are attached to each of the two stabilizing frame vertical spars either near the bottom (as shown) or at a higher elevation to improve frame pitch stability as necessary.

Figure 9:
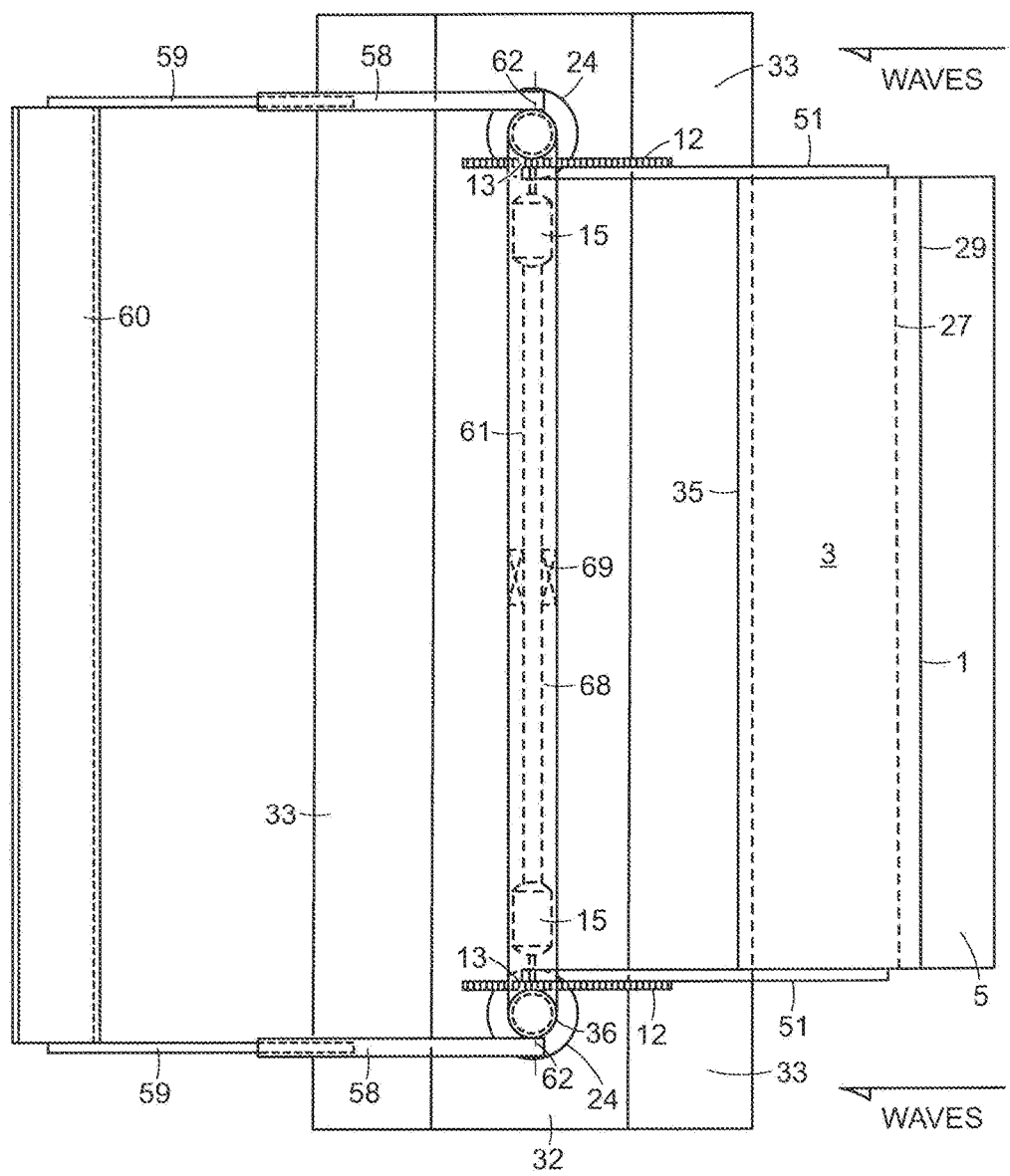
FIG. 9 is a plan view of the floats shown in FIG. 7.

FIG. 9 is a plan view of an embodiment of the present disclosure very similar to FIG. 8. It also shows a torsionally rigid tube 68 with mid span support bearing 69 that keep port and starboard side swing arms 51 from placing high stresses on their connection with float 3 when waves apply uneven forces upon the port and starboard side of float 3. FIG. 9 also shows an arrangement whereby neither float 3 nor float 60 and their respective swing arm pairs 51 and 58 can interfere or contact each other as they rotate about their pivot or hinge points 52 and 62, respectively.

Figure 10:
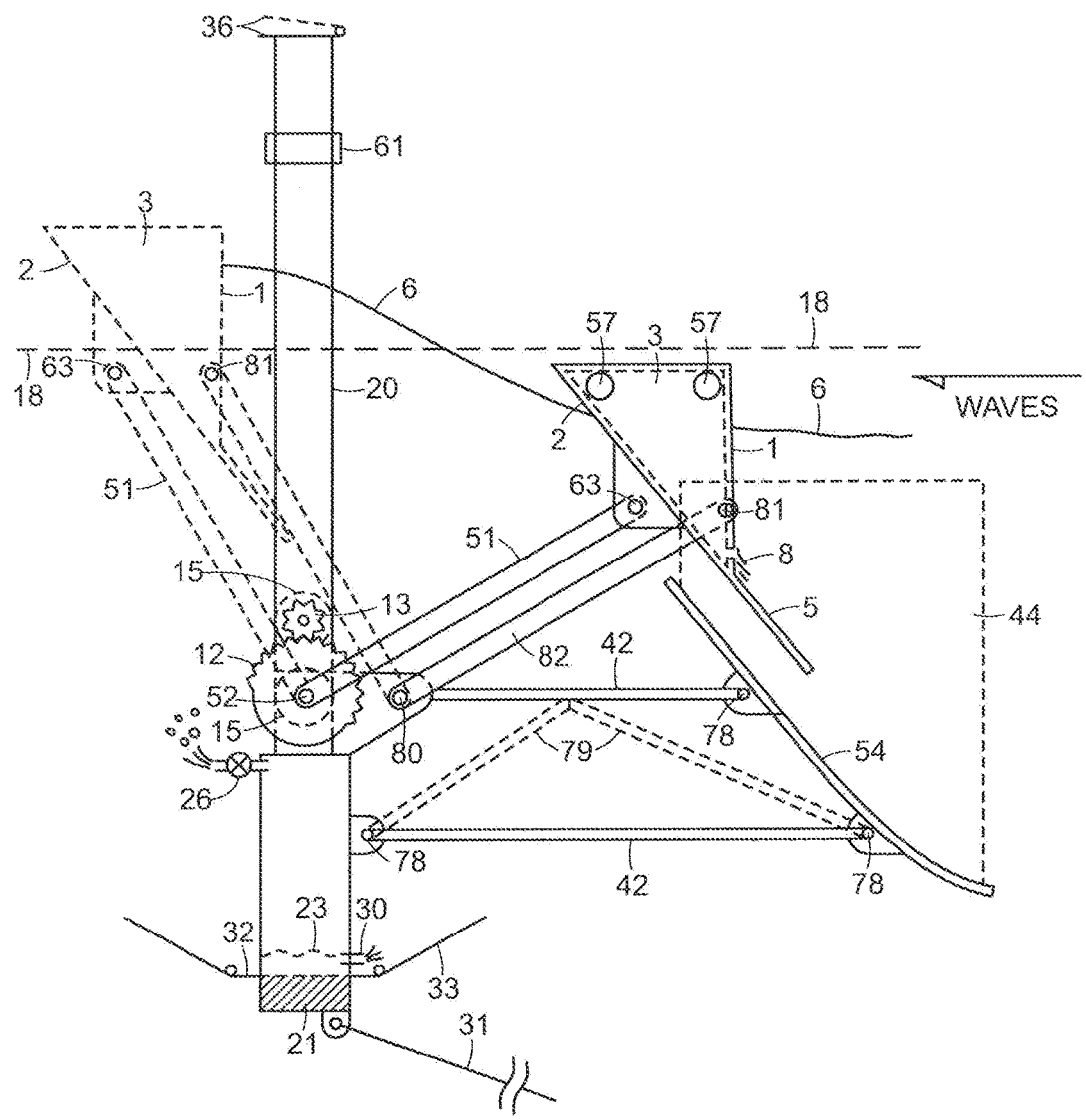
FIG. 10 is an elevational view of a WEC with parallel "dual swing arms" and optional shoal plane according to another embodiment of the disclosure.
Figure 11:
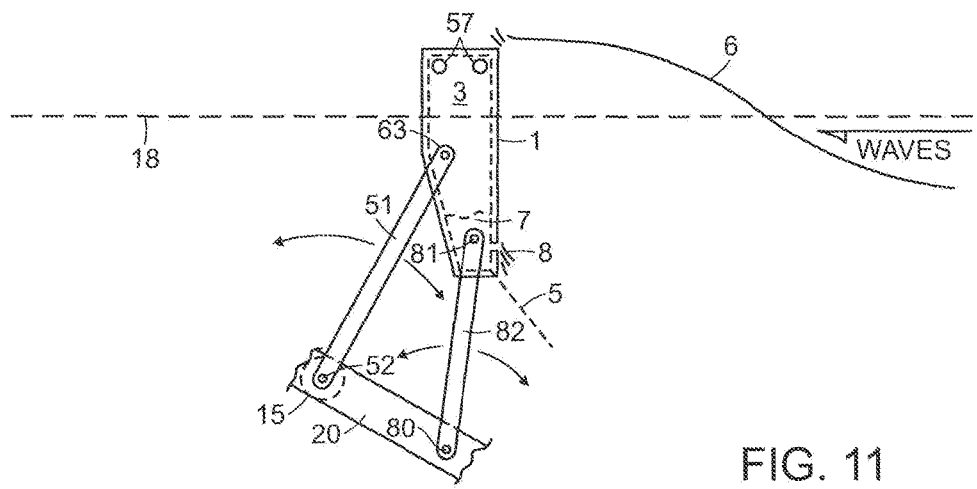
FIG. 11 is a view in elevation and in partial phantom of a surge flap WEC with "dual swing arms" according to a further embodiment of the disclosure.

FIG. 10 is a full elevation view similar to FIG. 8 (and FIG. 11 of U.S. application Ser. No. 14/101,325 included by reference) describing the "dual swing arms" of the present disclosure with dual approximately parallel swing arms 51 and 82, respectively, swinging about substantially submerged pivot or hinge points 52 and 80 and also pivotably connected to primary float 3 at hinge points 63 and 81, respectively. Swing arms 52 either drive generator 15 at pivot point 52 or drive a generator through bull gear 12 and pinion gear 13. The use of the "dual swing arm" float-to-frame mechanical linkages of the present disclosure substantially enhances the performance of either generic buoyant bottom-hinged vertical "surge flap" type WECs or generic near-surface-hinged horizontal floating "articulating raft" type WECs by concurrently increasing both the vertical and horizontal translation or movement of the entirety of such buoyant flaps, floats, or rafts (especially the areas near their stationary hinge points). The "dual swing arms" also provide control of the orientation of vertical wave impacting forward face 1 of float 3 throughout the entire wave cycle and float stroke maximizing the water column penetrating vertical depth of face 1 and any attached face extension plates 5. Further description and advantages of the "dual swing arms" of the present disclosure over generic "surge flap" and "articulating raft" type WECs are provided in the preceding DISTINGUISHING FEATURES OVER THE PRIOR ART section.

FIG. 10 also describes the use of a shoaling plane 54 with optional vertical converging side shields 44 (similar to that shown in my U.S. Pat. No. 8,614,520 at FIG. 5, elements 40 and 41) that further penetrate deeper vertically into the water column and focus oncoming waves toward float 3 for additional surge wave energy capture. Plane 54 can be attached to the stabilized frame by shoal plane mounting members 42 with pivoting connection points 78 such that plane 54 rotates downward when float 3 reaches its extreme downward position and would otherwise contact plane 54. It subsequently returns to its normal position using return springs at one or more pivot points 78 (not shown). Alternatively, frame 42 can be rigid using added members 79.

FIG. 10 shows the arc of travel of "dual swing arms" 51 and 82 (solid and dotted lines) providing a favorable down sloped direction of movement of float 3 that moves both upward and rearward during wave crests and returns forward and downward during ensuing wave troughs thus providing both lateral (horizontal) and vertical float movement or translation that, in turn, provides enhanced heave and surge wave energy capture efficiency over related art vertically oriented (in neutral SWL position) "surge flaps" or horizontally oriented "articulating rafts" that capture primarily surge or heave wave energy, respectively, but not both.

FIG. 11 shows a sectional elevational view of an embodiment of the present disclosure where "dual swing arms" enhance the movement or translation and, therefore, the wave energy capture efficiency of vertically oriented buoyant "surge flaps". This embodiment illustrates that the "dual swing arms" of the present disclosure (arms 51 and 82) need not be parallel to one another or of equal length, and the swing arm hinge or pivot points to the stabilizing frame or other stabilizing body (52 and 80), or to the float 3 (pivoting attachment points 63 and 81), need not be in horizontal or vertical alignment. As shown in FIG. 11, both the frame and float attachment points are sloped and the arms are of unequal length. This configuration allows the float forward face 1 to rotate slightly clockwise (with wave fronts approaching from the right) while the "dual swing arms" are rotating counterclockwise such that the float is translating both laterally and vertically for added surge and heave energy capture. Either arm can drive the generator or PTO 15 (here arm 51 is doing so at pivot point 52) and the neutral orientation of the "dual swing arms" (at the still water line) can be forward of their lower pivot points 52 and 80 so as to add heave and surge capture efficiency of the down sloped direction of motion previously described (in FIG. 10 and elsewhere).

Figure 12:
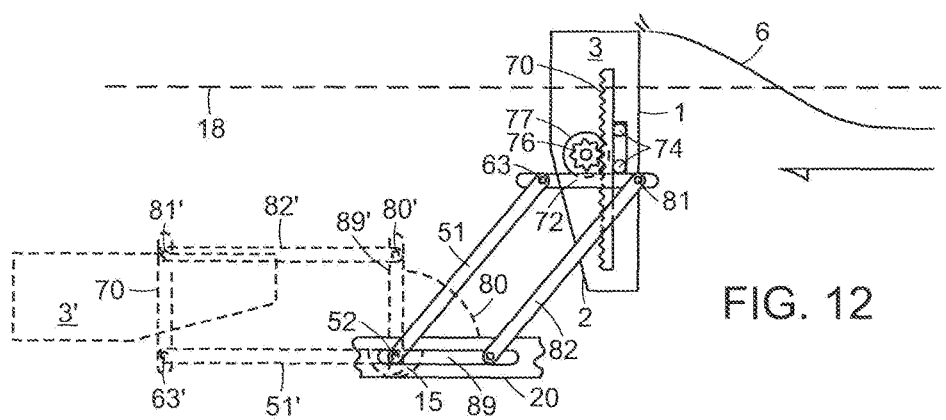
FIG. 12 is a view in elevation and in partial phantom of the surge flap WEC shown in FIG. 11 with a supplemental PTO or generator according to yet another embodiment of the disclosure.

In FIG. 12, another vertically oriented buoyant "surge flap" type float embodiment is shown that is an improvement over the prior art "surge flaps" in that it combines "dual swing arms" (as previously described) pivotably attached to flap attached horizontal cross members 72 on the sides of the buoyant flap. The buoyant flap is provided with additional vertical translation capability by float 3 rigidly attached drive arm 70 with rack gears 71 that move vertically between idler rolls 74 and pinion gear 76 driving a secondary PTO or generator 77 (similar to FIG. 15). Alternatively, vertical drive arm 70 engaging PTO or generator 77 can be mounted on stabilized or stationary frame member 20 (not shown). Some generic surge flaps that are usually deployed with their frames attached to the seabed in shallow water near shore, use their PTOs to submerge their buoyant flaps during severe sea conditions by rotating them away from oncoming waves to a near horizontal position. This can also be done with the improved dual swing array embodiments of the present disclosure by pivotably attaching the forward swing arm 82 to frame attached horizontal cross member 89 that itself can be released from the frame 20 and controllably rotated about point 52 allowing the entire flap (float) 3 to lay horizontal until severe sea conditions moderate.

Figure 13:
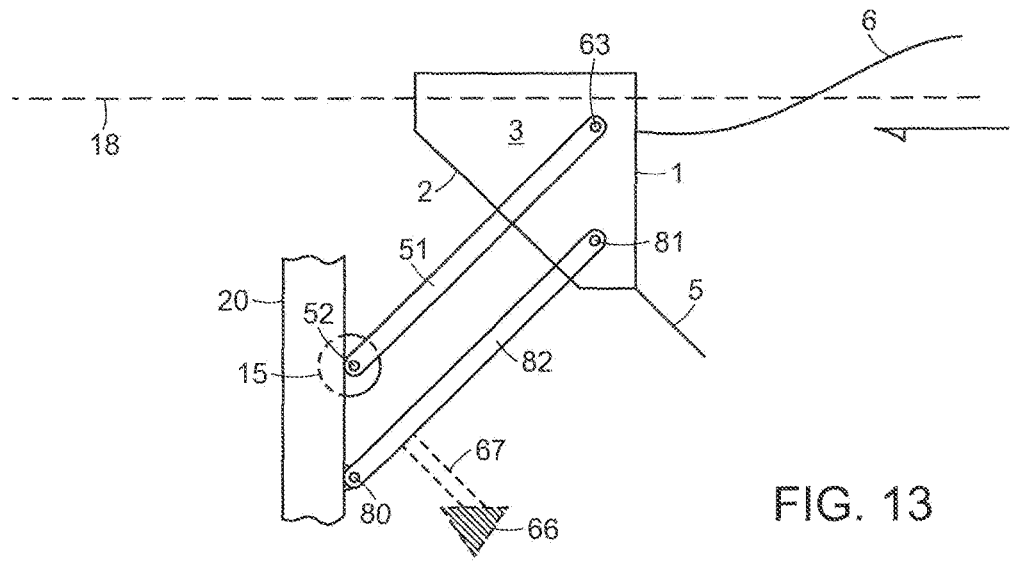
FIG. 13 is a view in elevation of a surge flap WEC shown in FIG. 11 with a counterweight arm according to yet another embodiment of the disclosure.

FIG. 13 shows a partial elevation view of another embodiment of the present disclosure (similar to FIG. 11 of my application Ser. No. 14/101,325) using the "dual swing arms" to improve the combined heave and surge wave energy capture efficiency of related art "surge flap" type WECs or other WECs with hinged or pivoting surface floats by maintaining float wave impacting face 1 vertical while biasing the swing arms forward either by adjusting the submerged depth of the arm to frame pivot or hinge points (52 and 80) relative to the SWL 18, and/or by adding forward hanging counterweight 66 attached to, and forward of, forward swing arm 82 from counterweight arm 67 attached to 82.

Figure 14:
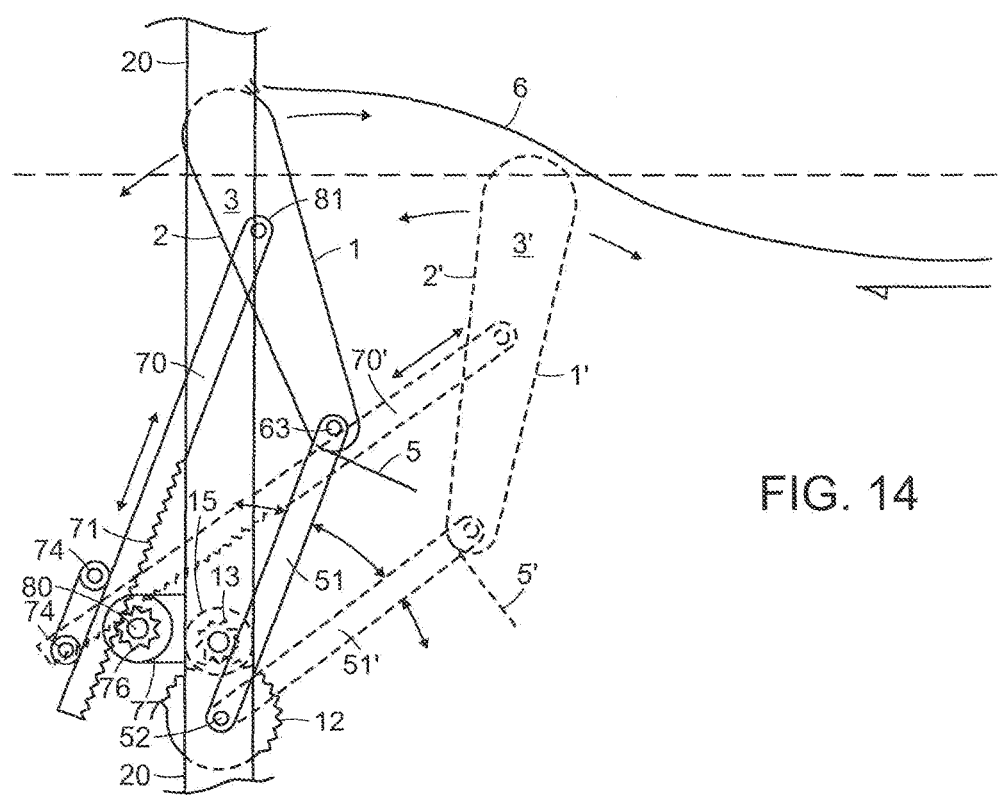
FIG. 14 is a view in elevation and partial phantom of the surge flap WEC shown in FIG. 11 with a supplemental or secondary PTO according to another embodiment of the disclosure.

FIG. 14 shows a partial elevation view of another embodiment of the present disclosure using dual swing arms 51 and 70 pivotably attached to float 3 at points 63 and 81, respectively. Arm 51 is of fixed length as in FIGS. 11-13, and pivots about point 52 to drive PTO or generator 15 through bull gear 12 and pinion 13. Arm 70, however, pivoting about 80 is of variable length having gear teeth 71 driving secondary PTO or generator 77, or also driving primary PTO 15 (not shown). This variable length dual swing arm allows float 3 to also rotate about its bottom pivot point 63 for additional energy capture. Variable length swing arms of the present disclosure are also referred to herein as "compound swing arms".

In advantageous embodiments of the present disclosure, it is desirable to have the one or more surface floats pivoting upward and rearward during oncoming wave crests and forward and downward on ensuing wave troughs. This requires the single or dual, simple or compound, swing arms of the present disclosure to lie at a forward biased angle if swinging about one or more substantially submerged pivot points or at a rearward biased angle if pivoting about one or more substantially elevated pivot points. This differs from the vertical orientation of related art "surge flaps" or the horizontal orientation of related art "articulating rafts" or floats relative to the SWL. A neutral bias angle of 45 degrees forward of vertical upward is ideal for swing arms hinged aft of their respective floats and "substantially below the SWL" (45 degrees aft of vertical downward is therefore ideal for floats trailing hinge point(s) substantially above the SWL). "Substantially above" or "substantially below" as used herein refer to a hinge point location above or below the SWL greater than ⅓ of the radial length or distance from the hinge point to the extremity of the float or flap. This can be accomplished in any of the embodiments of the present disclosure whether using single or dual, simple or compound, swing arms by (1) raising or lowering the hinge points below (or above) the SWL (either by changing the elevation or submerged depth of the "stabilizing frame or body" to which the hinge points are attached, (2) changing the elevation of the hinge points relative to the "stabilizing frame or body", and/or (3) changing the radial length from the hinge point(s) to the center of buoyancy of the floats or flaps such as by using variable or adjustable length, or compound swing arms.

Figure 15:
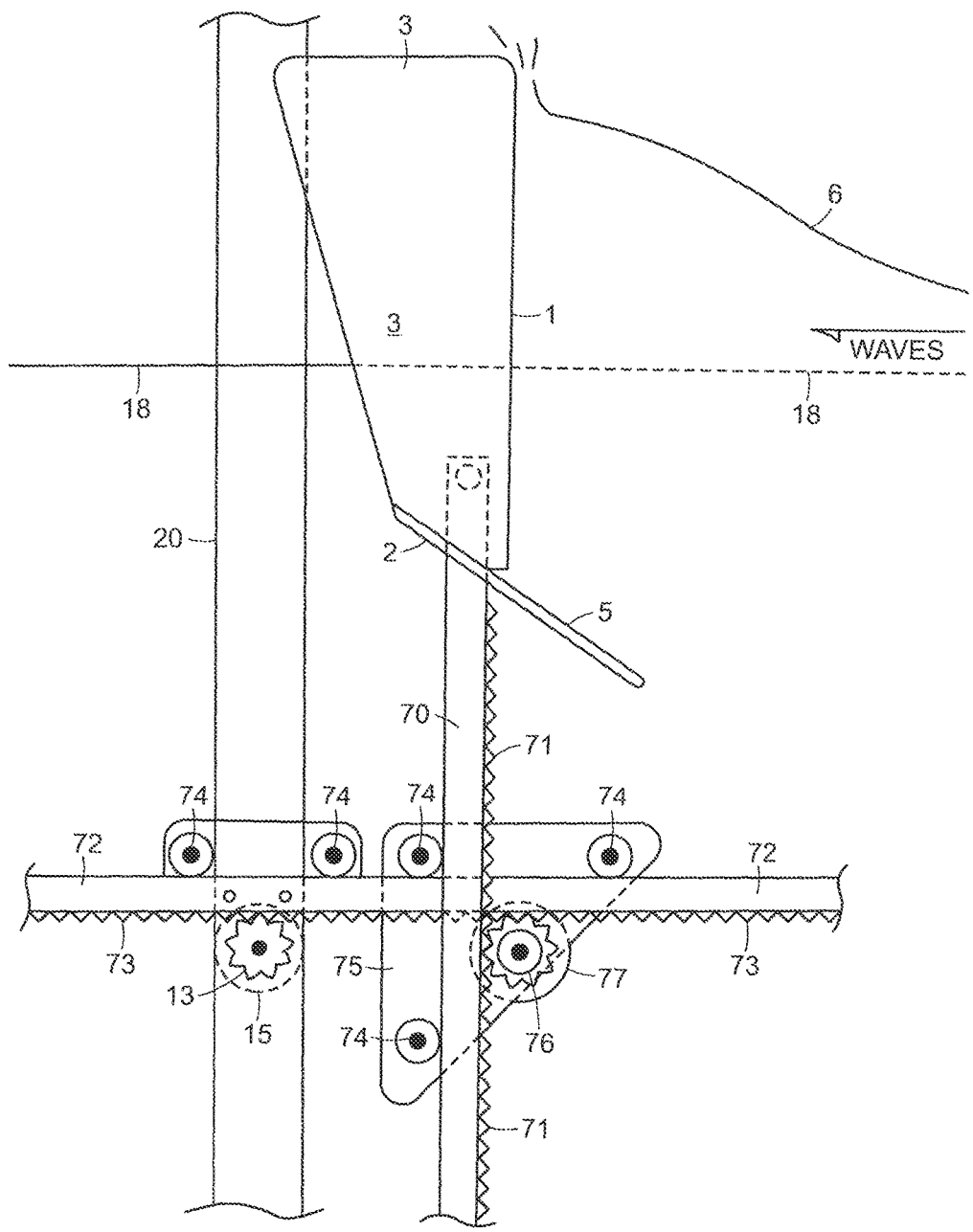
FIG. 15 is a view in elevation of a surge flap WEC with compound x-y axis drives according to a yet further embodiment of the disclosure.

FIG. 15 shows a partial elevation of an embodiment of the present disclosure (also shown in FIG. 10 of Ser. No. 14/101,325) wherein two "compound motion arms" of the present disclosure, one shown vertical 70 and the other shown horizontal 72 allow a vertically elongated "surge flap" type float 3 to concurrently move (translate) concurrently both vertically (for wave heave energy capture) and laterally (for surge energy capture) with both translations driving either a single PTO or generator (or hydraulic pump) 77 with horizontal arm 72 rigidly attached to frame member 20. Alternatively, arm 72 can travel horizontally between idlers 74 and pinion gear 13 on frame member 20 driving separate PTO or generator 15.

Figure 16:
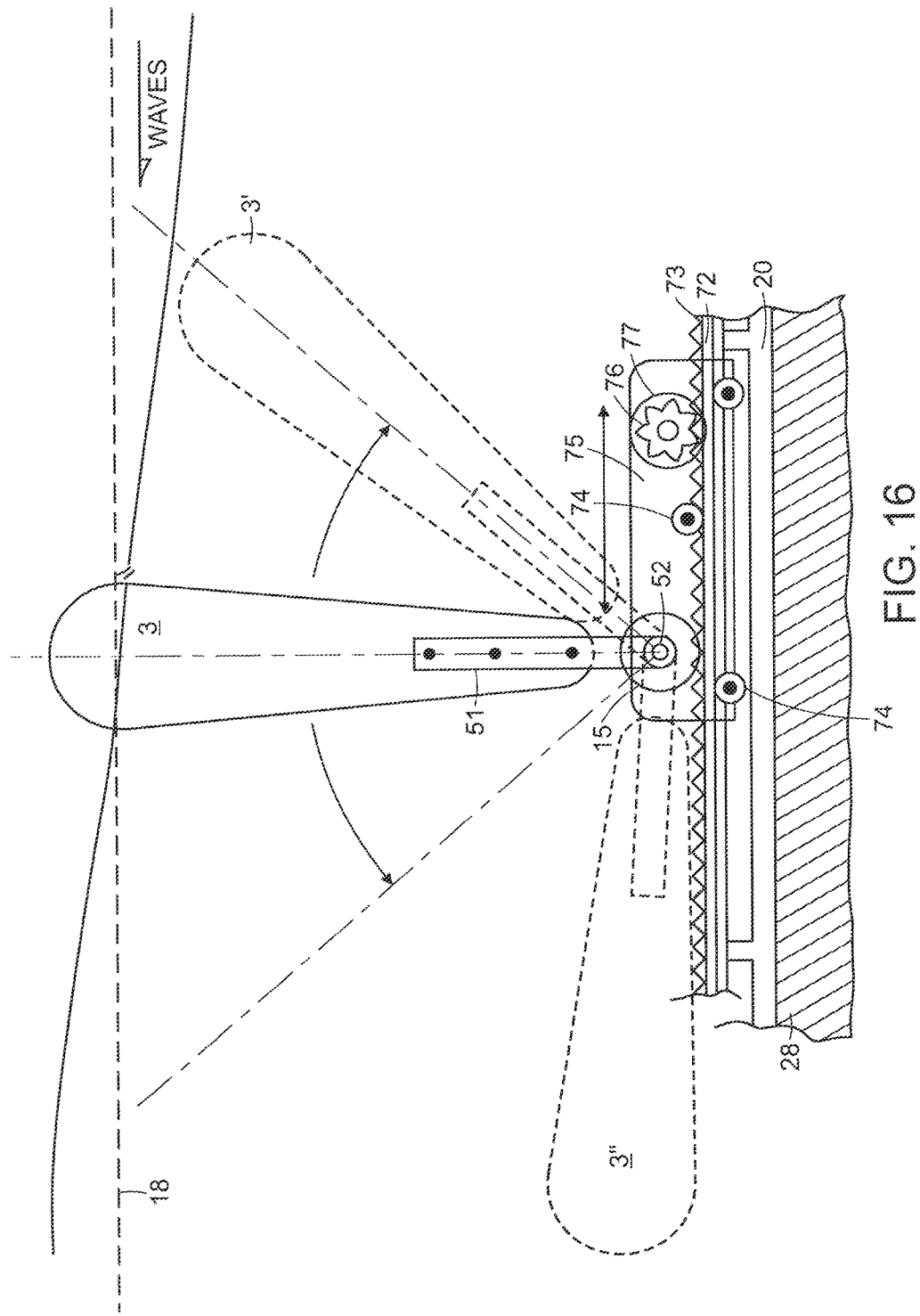
FIG. 16 is a view in elevation and in partial phantom of a surge flap WEC with a compound x axis drive on a bottom hinged flap gate according to a still further embodiment of the disclosure.

FIG. 16 shows a partial elevation of an similar embodiment of the present disclosure wherein a generic bottom hinged "surge flap" type WEC with a vertically elongated float 3 on arms 51 is improved by adding a lateral "compound motion arm" or track 72 that allows the bottom hinge 52 to translate laterally on carriage 75 traveling on track 72 with idler rolls 74. Gear rack 73 on top of track 72 engages pinion gear 76 driving secondary generator 77 or other PTO while flap 3 is concurrently rotating about the hinge point 52 driving primary PTO 15. Track 72 is rigidly mounted on lateral frame member 20 firmly affixed to the seabed 28 or other stabilized body (not shown). Dotted flap position 3" shows the flap lying horizontal for protection from severe sea conditions. Additional performance improvements over generic "surge flaps" can be obtained by establishing a forward biased neutral (SWL) position for float/flap per 3', providing a variable length mechanism within arm 51 or within its attachment to float/flap 3 (such as shown in FIG. 8 variable length arms 58 and 59) to compensate for tidal changes in SWL 18, or using the "compound motion arm" of FIGS. 15, 17, or 19 and 20.

While many of the previous and following figures and descriptions of embodiments of the present disclosure describe the use of geared or direct drive rotary electric generators (currently gaining popularity in WEC devices) other PTO types can be readily substituted without materially parting from the spirit and scope of the disclosure including, but not limited to, PTOs using low or high pressure hydraulic piston/cylinders (using water or hydraulic fluid, respectively) to power water turbine or rotary hydraulic motor driven electric generators.

Likewise figures and descriptions of the "compound motion arms" of the present disclosure are depicted as using rack and pinion linear drives. Other linear type PTO drives can readily be substituted including direct drive linear electric generators, helix or ball screw type linear to rotary drives, and capstan cable, gear, cog, or other belt drives, and chain drives without departing from the present disclosure. It should also be noted that any of the embodiments of the present disclosure can utilize protruding lower lip 5 shoal plane 64 of FIG. 10 to penetrate deeper into the waver column for additional wave energy capture. Any of the embodiment s of the present disclosure can likewise utilize partial or full submergence of the one or more floats as described in my U.S. Pat. No. 8,614,520, or my application Ser. No. 14/101,325, or per FIG. 10 of the current disclosure for float and WEC protection during severe sea conditions, or to optimize WEC wave energy capture in any specific sea condition.

Figure 17:
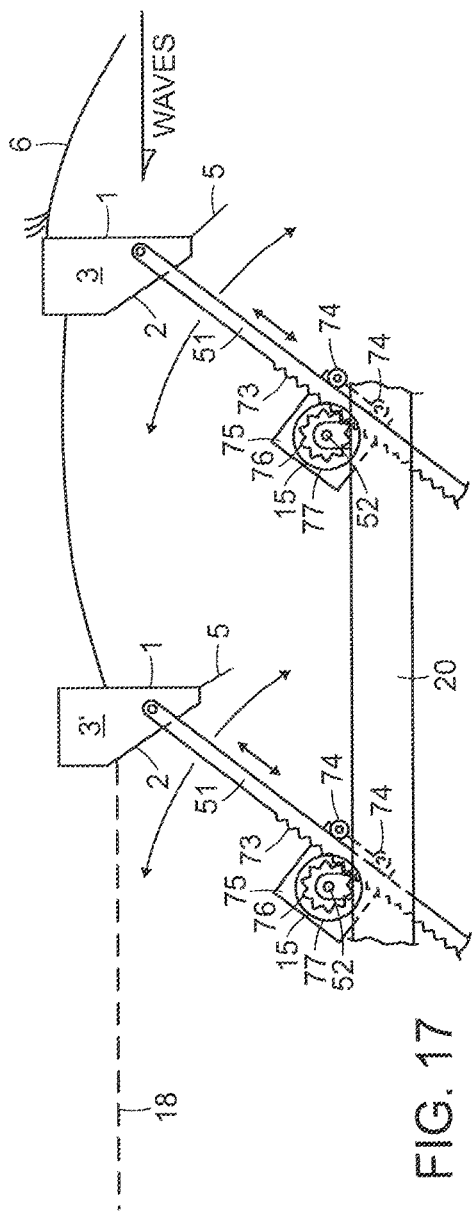
FIG. 17 is a view in elevation of a WEC with dual floats each with a subsurface pivot point "compound motion swing arms" according to yet another embodiment of the disclosure.

FIG. 17 provides a partial elevation view of an embodiment of the present disclosure utilizing one (not shown) or two floats or flaps, 3 and 3' (shown) mechanically linked using compound swing arms 51 to horizontally oriented partial frame or other stabilizing body section 20. In both FIGS. 17 and 18, compound swing arms 51 oriented or neutrally biased (at SWL level 18) forward (rather than vertical like generic surge flaps) produce the more desirable sloped arcuate motion of floats 3 as previously described. When "surge flaps" are deployed near shore in shallow water (under 20 meters), where most of the available wave energy is surge not heave, employing the sloped motion of several embodiments of the present disclosure to float or flaps 3 rather than the forward and rearward rotation around a vertical neutral (SWL) position used by generic "surge flaps", may provide a relatively small performance gain.

When "surge flaps" are used in "deep water" (depths greater than ½ average wave length), however, like the Langlee WEC, major gains can be realized from the forward bias produced sloped motion of the present disclosure.

"Compound swing arms" 51 are configured to allow concurrent lateral movement along their length to drive secondary generator 77 with pinion gears 76 that are, in turn, driven by rack gears 73 on arms 51 and simultaneously allow arcuate rotation of arms 51 about pivot points 52 to drive primary generators 15 (not visible, but concentric and inboard or outboard of generator 77). During initial impact of float 3 front face 1 with oncoming wave 6, float 3 exerts a downward (compressive) force on arms 51 causing attached gear rack 73 to rotate generator 77 through pinion gear 76. Concurrently, both wave lateral surge forces and vertical heave (buoyant) forces on float or flap 3 cause a counter-clockwise rotation of arms 51 driving primary generator 15. During ensuing wave troughs, the translation and rotation of arms 51 are reversed and drive generators 76 and 15 in the opposite direction (unless reversing gears are used with or without ratcheted flywheels).

Figure 18:
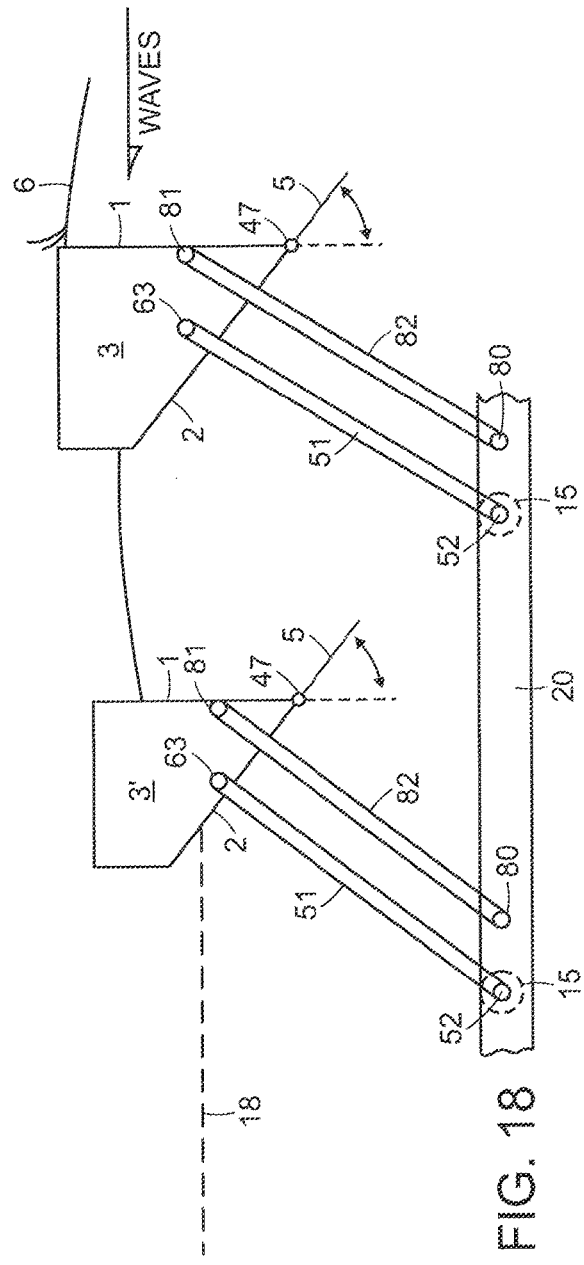
FIG. 18 is a view in elevation of a WEC with dual floats with subsurface pivot point "dual swing arms" according to still another embodiment of the disclosure.

FIG. 18 provides a partial elevation of an embodiment of the present disclosure similar in function to FIG. 10, but using two floats or flaps 3 rather than one mounted on a lateral frame or stabilizing body member 20 (shown in partial view). If there remains sufficient uncaptured wave energy passing through the forward float or flap 3 to justify use of a second float or flap 3', then using the two down sloped motion floats shown in FIG. 18 will provide superior capture efficiency over the two float configuration of related art FIG. 5 (Columbia StingRAY) because both floats utilize the advantages (as previously described) of both the down sloped capture motion and the dual swing arms of the present disclosure.

Figure 19:
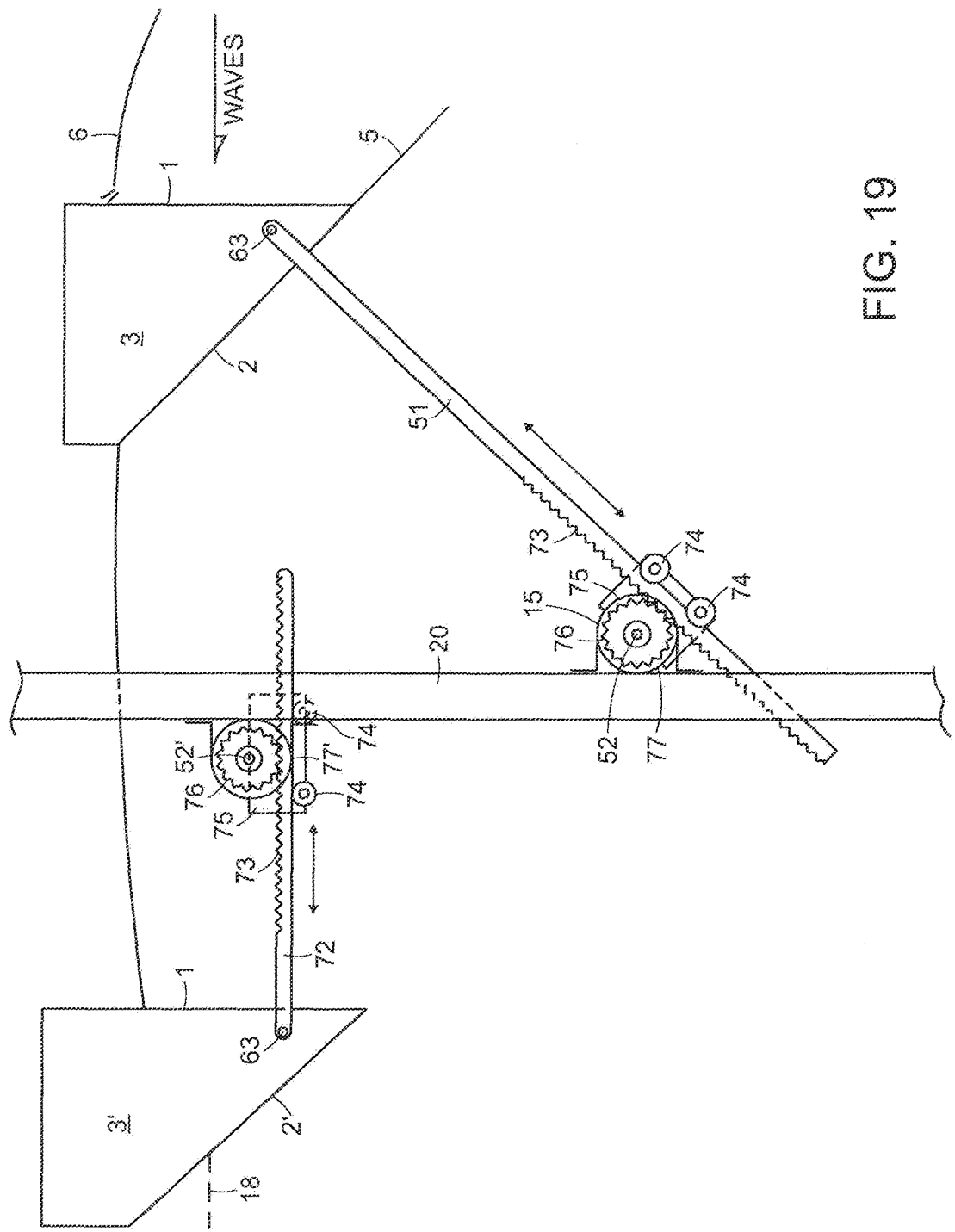
FIG. 19 is a view in elevation of a WEC with a fore float on subsurface pivot point "compound motion swing arms" with compound drives and an aft float with "compound motion swing arm" with PTO drives on or near the water surface (SWL) pivot point according to a further embodiment of the disclosure.

FIG. 19 provides a partial elevation of another two float or flap (3 and 3') embodiment of the present disclosure configured like FIG. 8 (with forward float 3 hinged about point 62 to partial frame section 20 substantially below the SWL and rearward float 3' hinge point 52' at or near the SWL). The embodiment shown in FIG. 19, however, utilizes the "compound motion arms" of FIG. 17 that allow concurrent rotation and translation for additional energy capture.

Figure 20:
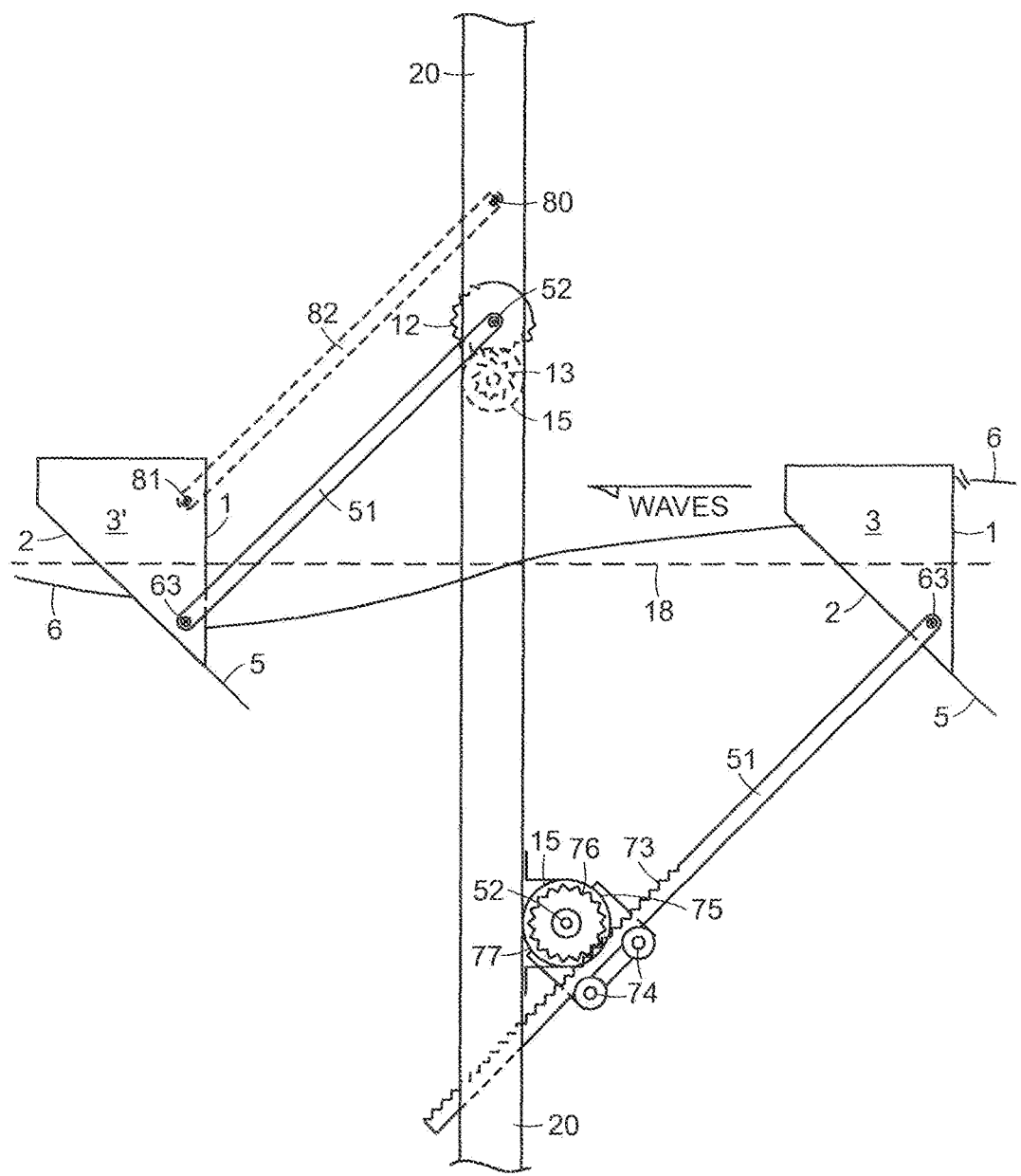
FIG. 20 is a view in elevation of a WEC with a fore float on subsurface pivot point "compound motion swing arms" with compound drives and an aft float with "compound motion swing arm" pivot point with PTO drives substantially above the water surface (SWL) according to a still further embodiment of the disclosure.

FIG. 20 provides a partial elevation of another two float or flap (3 and 3') embodiment of the present disclosure. The front float 3 utilizes compound motion arms as in FIG. 19 while the rear float 3' uses the dual swing arms (51 and 82) as previously described, but with the dual arm pivot points (52 and 80) substantially above the SWL and forward of float 3' resulting in the desirable sloped motion of float 3' providing enhanced heave and surge wave energy capture by PTO or generator 15 through bull gear 12 and pinion gear 13.

Figure 21:
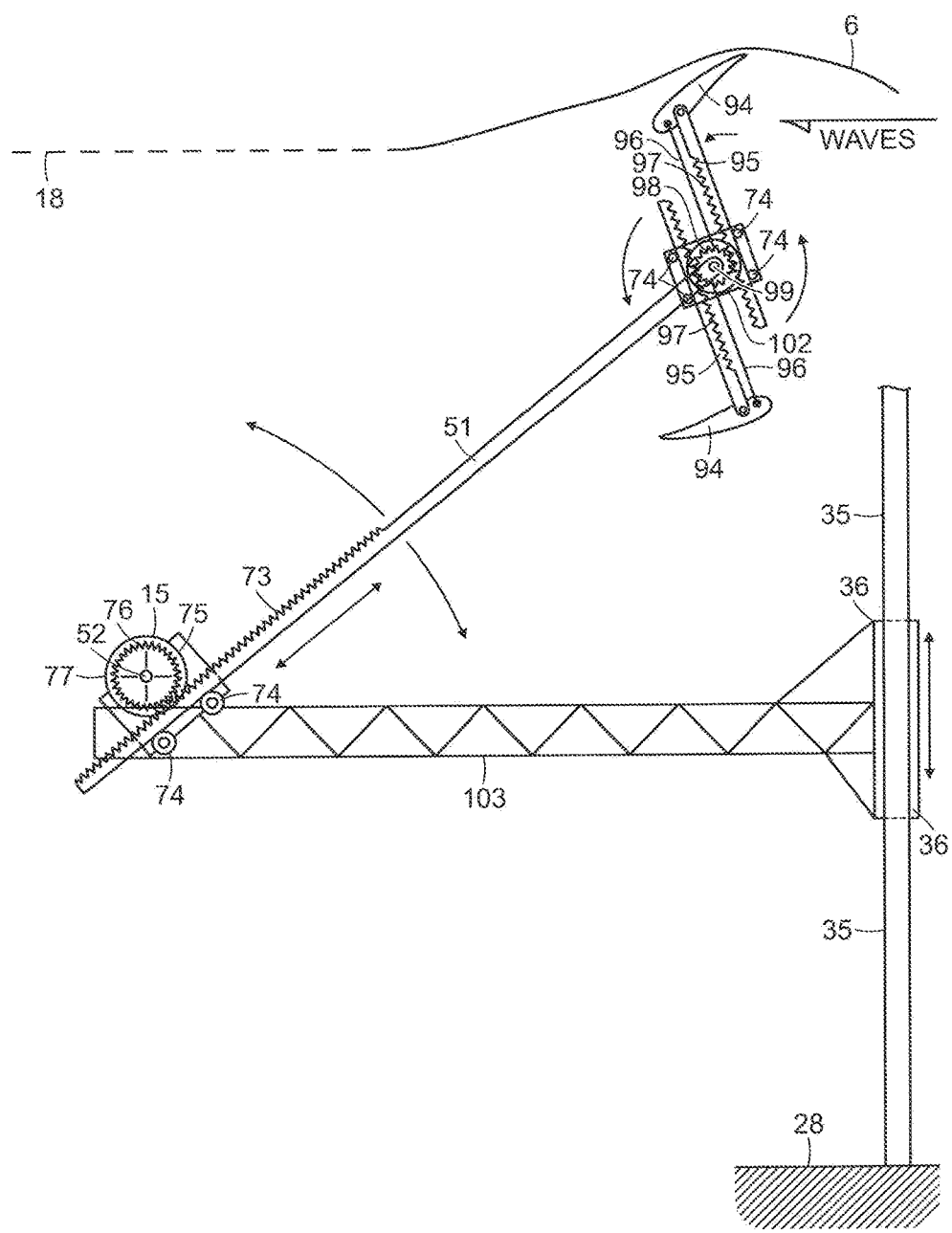
FIG. 21 is a view in elevation of a WEC with a buoyant wave driven cycloidal rotor on subsurface hinged "compound motion swing arm" according to a yet further embodiment of the disclosure.

FIG. 21 provides a full elevation view of an embodiment of the present disclosure that combines the "compound motion arm" 51 (per FIGS. 17 or 19 and 20) with a twin rotor 94 horizontal axis cycloidal Voith-Schneider type propeller or rotor assembly driving generator or PTO 102 with wave-induced forces on rotor blades 94, the assembly having net positive buoyancy and thus reacting like a float or flap. The twin rotors have pitch control rods or cables 96 that are independently controlled to maximize the net wave induced torque on the rotor about point 99. The rotor blades 94 are supported by rotor arms 95 that are optionally of adjustable length for adjustment to varying average wave amplitudes, using gear racks 97 driven by pinion 98. As in FIGS. 17, 19 and 20, the one or more compound arms 51 drives generator or PTO 77 gear rack 73 and mating pinion 76 via its translation and concurrently drives generator or PTO 15 via its rotation about pivot point 52.

The "Compound motion arm" drive assembly is mounted on lateral truss 103 that provides a stabilizing base. Truss 103 is attached to seabed 28 affixed pole or piling 35 through slide and pivoting joint 36 such that it is free to both move slowly vertically to adjust for tidal changes in the SWL 18 and to rotate in a horizontal plane to keep the rotor axis parallel to oncoming wave fronts 6. The net buoyancy of all WEC components affixed to pole 36 is net positive. During severe sea conditions, arm 51 can be rotated downward (clockwise) and/or joint 36 can be pulled downward toward the seabed by a tension cable or other supplemental drive (not shown) for survival protection. The rotor (or any of the WECs with elongated floats or flaps of previously described embodiments of the present disclosure) will self-orient itself parallel to oncoming wave fronts as long as the wave induced lateral (surge) forces acting against such elongated rotors, floats or flaps are down-sea of the pole, piling, tower, mooring buoy or other pivoting attachment point.

FIGS. 22-24 illustrate how the "compound motion arms" or "dual swing arms" of the present disclosure can also be applied to WECs where the one or more swing arm pivot points are above the SWL rather than at or advantageously below the SWL per previously described embodiments. In FIG. 22, the "compound motion arms" embodiment of the present disclosure, as described in FIGS. 17 and 19-21, are mounted on a motion stabilized frame or body member 20 such that buoyant float or flap 3 is trailing arm pivot points 52 located above the SWL thereby allowing the more effective down-sloping motion of float 3 that increases the capture of both heave and surge wave energy components as previously described. The less desirable configuration with float 3 preceding the "compound motion arm" pivot point 52 as shown on FIG. 23 is also an embodiment of the present disclosure. In this embodiment, the compound drive or PTO mechanism including primary generator 15 and secondary generator 77 (shown of equal diameter and inboard or outboard of each other) are mounted on a seawall, breakwater, or other stabilized body.

In FIG. 24, the "dual swing arms" embodiment, as previously described in FIGS. 10-13 and 18 one or both dual arm pivot points 80 and 52 on stabilized frame or body member 20 are mounted above the SWL and above float or flap pivot points 81 and 63 such that float 3 moves in the more desirable downward-sloped direction moving upward and rearward during oncoming wave crests 6 and returning downward and forward on ensuing wave troughs. The less desirable configuration with float 3 preceding pivot points 80 and 53 is not shown, but is also an embodiment of the present disclosure.

Figure 25:
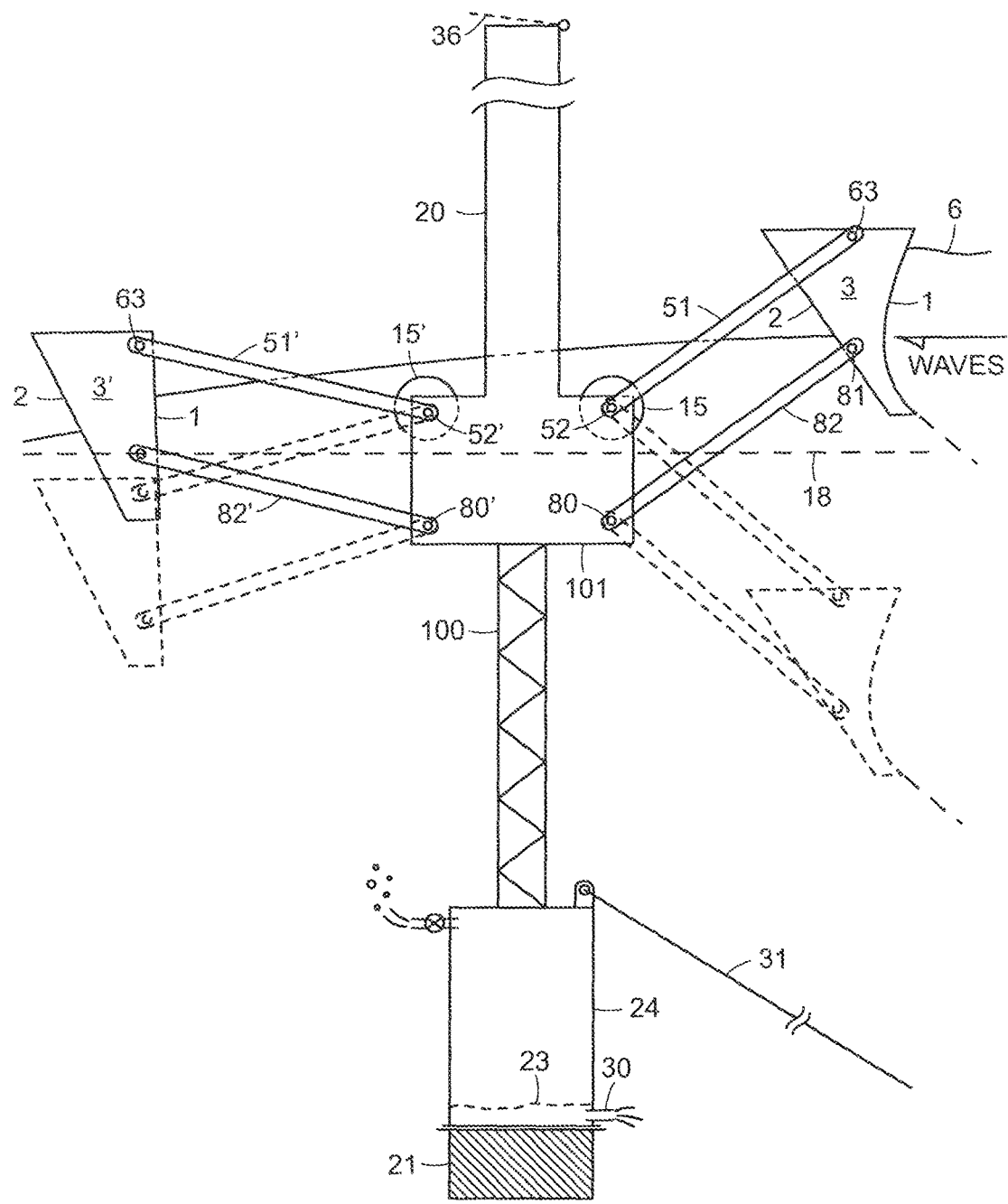
FIG. 25 is a view in elevation of a WEC with fore and aft floats each surface hinged to a frame/reaction mass with "dual swing arms" with pivot points located approximately at the water surface (SWL) according to a further embodiment of the disclosure.

FIG. 25 depicts an elevation view of the present disclosure where fore and aft floats (3 and 3') are mechanically linked by "dual swing arms" (51 and 82 fore and 51' and 82' aft) to stabilized frame 20 "at or near the SWL" at hinge points 52 and 80 fore and 52' and 80' aft. The "dual swing arms" are otherwise as described in FIGS. 10, 11, 13, 18 and 24. FIG. 25 (unlike FIGS. 8 and 10) also shows a truss 100 located between the dual (port and starboard) vertical spar frame upper members 20 and lower spar frame member 24 with integral ballast tank as well as port and starboard mooring cables 31 that converge at an up-sea mooring that functions as another pivot point (not shown).

Figure 3:
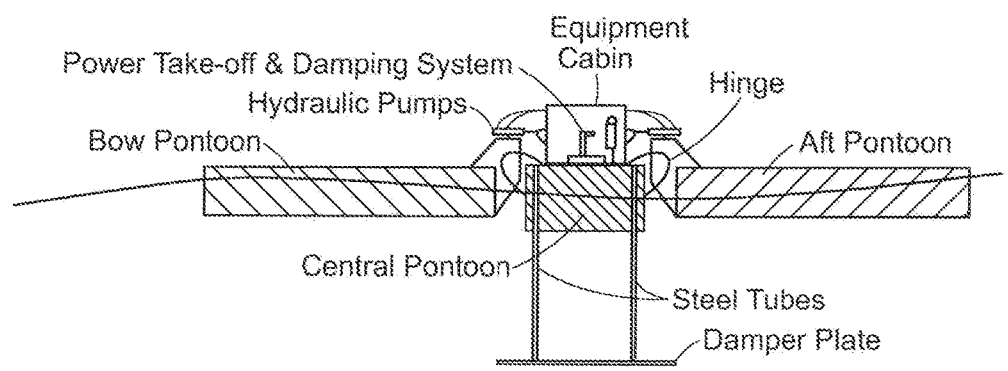
FIG. 3 is a sectional view of a related art WEC by McCabe Wave Pump.
Figure 4:
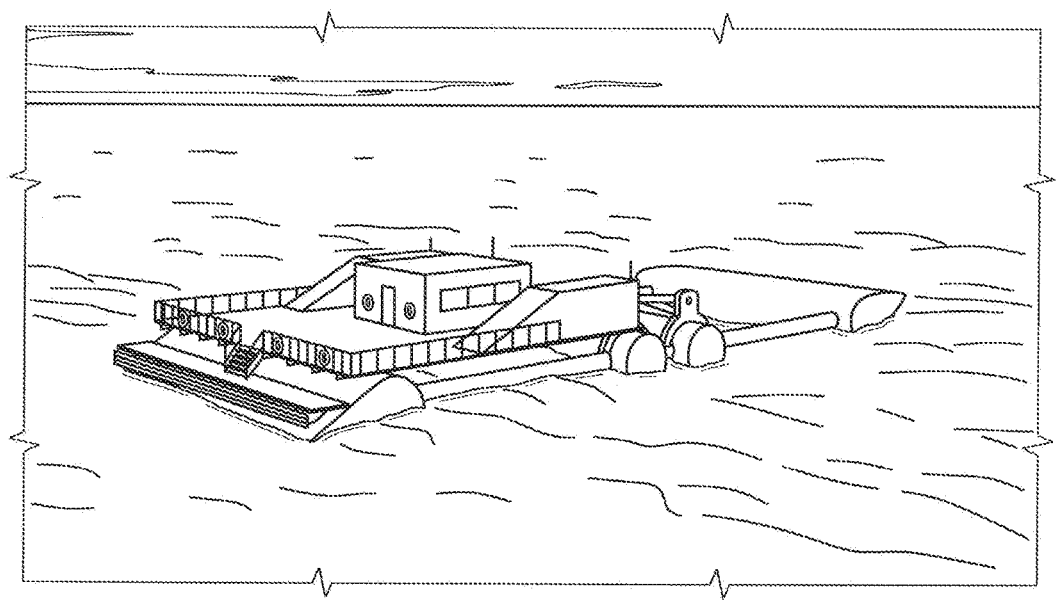
FIG. 4 is a top isometric view of a related art WEC by Dexawave.
Figure 5:
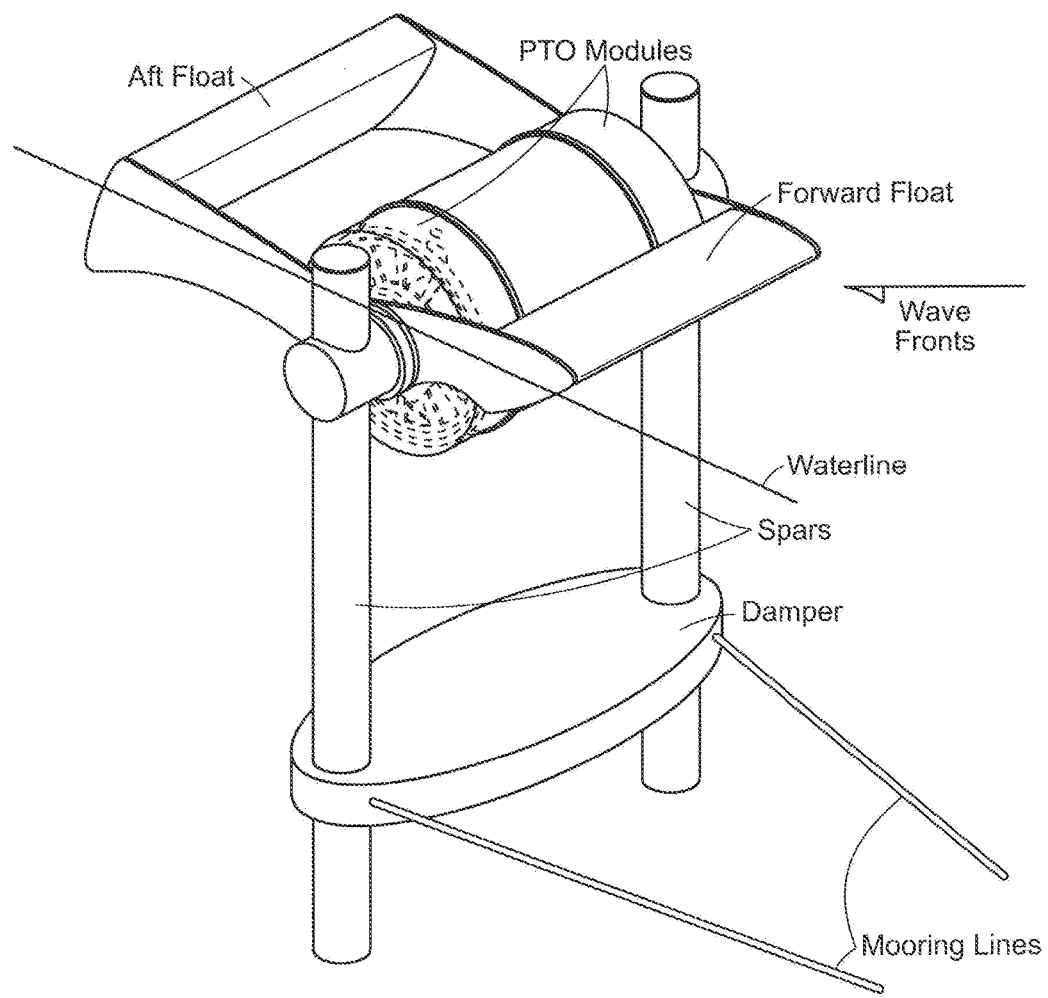
FIG. 5 is an isometric view of a related art WEC by Columbia StingRAY.

Generic "articulating raft" type WECs (related art McCabe, Dexawave, and Stingray shown in FIGS. 3-5 respectively, use raft or float hinge points "at or near the SWL". This generic configuration can be substantially improved by using the "dual swing arms" of FIG. 25 of the present disclosure.

Embodiments of the present disclosure using both fore and aft floats, if needed, and placing the fore float hinge points to the fixed or stabilized frame or body "substantially below the SWL" (like those shown in FIGS. 10, 11, 13 and 18) and the aft hinge points to the stabilized frame or body "substantially above the SWL" (as shown in FIG. 23), while not specifically illustrated herein, are advantageous over the FIG. 14 configuration (because they produce the advantageous down sloped swing path for both floats) and are a part of the present disclosure. Embodiments using any combination of "dual swing arms" and "compound swing arms" connecting one or more floats with arms hinged below, near, or above the SWL are, likewise, a part of this disclosure. Embodiments utilizing single (simple) swing arms linked to fore and aft elongated floats with the fore float to frame linkage below the SWL and the aft float linkage above the SWL are likewise embodiments of the present disclosure as are dual float single swing arm configurations where both fore and aft frame hinge points are both below or both above the SWL.

The elongated wave front parallel floats of the present disclosure are fully submergible during severe sea states by: 1) PTO or auxiliary drive forced float submergence, 2) increasing the submerged depth of the stabilizing frame or body connecting arm hinge points, and/or 3) reducing the combined buoyancy of the stabilizing frame and at least one float by allowing seawater to enter cavities in either or both. These float submergence methods and those described in my application Ser. No. 14/101,325 can likewise be applied to all embodiments of the present disclosure including the use of variable and controlled buoyancy floats and frames either to facilitate their partial or total submergence (and re-emergence), or to optimize their mass for improved performance.

Most embodiments of the present disclosure described in the specification and depicted in the drawings utilize matching pairs of swing arms or axial drives on either side of elongated floats. Because wave-induced forces on either end of such elongated floats will seldom be equal, horizontal "torque tubes" (68 in FIG. 9) or comparable connections can be utilized at any or all pivot points in any embodiments to prevent such unequal loads from "racking" the elongated floats and their swing or connecting arms.

The present disclosure is not limited to the specific configurations and descriptions presented herein but also applies to other applications and combinations of the principles disclosed.

What I claim as new and desire to secure as United States Letters Patent is:

1. A wave energy converting device comprising:
    at least one elongated surface float or buoyant flap having a center of buoyancy and having a wave impacting forward face wherein the face is oriented or self-orienting substantially parallel to prevailing or oncoming wave fronts and wherein the horizontal width of the face, alone or in combination with adjacent float faces, is greater than the float fore-to-aft depth measured excluding any float attachments, extensions or appendages;
    a frame or base stabilized against wave-induced heave, surge, and pitch motion, or a stationary or fixed base having a portion to which the at least one float is movably connected by at least one rotating swing arm, linear translating arm, or rotating and translating compound-motion connecting arm, wherein the at least one arm is rotatably connected to the frame or base at an arm-to-frame hinge point substantially below the still water line (SWL), and rearward or forward of the at least one float's center of buoyancy in still water, whereby the at least one arm controls the orientation and path of wave-induced relative motion between the at least one float and the frame or base in such a manner that the float rotates, translates, or both rotates and translates concurrently both vertically and horizontally relative to the arm's connection point to the frame in response to wave induced-forces on the float;
    frame or base position stabilizing, fixing or anchoring devices, directly or indirectly connected to the frame or base, selected from the group consisting of the seabed, shorelines, breakwaters, seawalls, platforms, pilings, gravity weights, water or solid ballasts, anchors, mooring lines, seabed affixed or floating off-shore towers, floats or vessels, affixed surface buoys, drag plates or planes, and combinations thereof; and,
    at least one power take off (PTO) apparatus secured to or within the frame or float and configured to be driven by the at least one force generated by the wave-induced relative motion between the at least one float and the frame through the at least one arm.

2. The device of claim 1 wherein the elevation or submerged depth in still water and mass of the at least one float or flap can be controllably lowered or raised by increasing or decreasing the float's seawater ballast or buoyancy by raising or lowering the frame or frame attachment points by increasing or decreasing frame seawater ballast or using the at least one PTO apparatus or an auxiliary drive to force submergence of the at least one float, frame, or the at least one frame-to-float attachment point.

3. The device of claim 1 wherein the at least one buoyant float or flap has at least one cavity and at least one aperture to controllably admit or release seawater to increase or decrease the mass or buoyancy of the at least one float or flap.

4. The device of claim 1 wherein the at least one arm is a parallel pair of swing arms, each rigidly or pivotably attached at separate locations to the at least one float or flap and each pivotably attached at separate locations to the frame or base to form arm-frame hinge points, wherein the movement of the at least one float and the corresponding parallel pair of swing arms drive the at least one PTO.

5. The device of claim 1 wherein the at least one arm is two arms or arm pairs, the first arm being attached to and below the at least one float or flap and oriented substantially vertically allowing substantially vertical float motion through its connection with a second arm, or carriage translating on the second arm, the second arm being movably or rigidly attached to the frame or base substantially horizontally to permit substantially horizontal or lateral float motion, both arms driving a common PTO, or each driving separate PTOs.

6. The device of claim 1 wherein the at least one arm is two arms or arm pairs, the first arm being attached to and below the at least one float or flap and pivotably secured at its lower end to a carriage moving substantially laterally on a substantially horizontally or laterally oriented second arm, the rotation of the first pivoting arm and the translation of the second lateral arm or arm pairs, or the carriage, each driving at least one PTO.

7. The device of claim 1 wherein the angle between the at east one float arm-to-frame hinge point and the float's center of buoyancy at the still water line can be established and controlled by lowering or raising the frame, the arm-to-frame hinge point, by extending one or more counter weights from the arm forward or aft of the hinge point, or by adjustably changing the length of the arm.

8. The device of claim 1 further comprising at least one second aft float oriented substantially parallel to, and located substantially aft of, the at least one float and the at least one arm-to-frame hinge point, wherein the second float is secured by aft float arms or appendages of the at least one second float rotatably or rigidly connected to the frame or base either substantially below, in close proximity to, or substantially above the SWL with the second float driving a second PTO when the second float's arms are rotatably connected to the frame, and wherein the second float's arms can be released to a substantially vertical orientation to provide residual buoyancy when the frame and the at least one float are submerged, and wherein the at least one second float provides additional pitch stability to the frame.

9. The device of claim 4 further comprising at least one horizontal torque conveying tube, rod, or shaft located at one or more of the at least one frame or float's swing arm pivot points, rigidly connected to, and rotating with, two or more parallel swing arms maintaining the parallel orientation of the swing arms when waves apply unequal forces to the at least one elongated float.

10. The device of claim 1 wherein the length of the at least ore float arm is measured along the axis line from the arm's hinge point with the frame or base through the float's center of buoyancy, which exceeds ½ of the float's vertical height excluding any attachments, extensions, or appendages.

11. The device of wherein 1 wherein the at least one float is comprised of an elongated buoyant rotor comprised of at least two blades or foils rotating about a common horizontal axis driving a first PTO, the rotor being pivotably, or pivotably and translationally, connected to the frame by the at least one arm, wherein the arm drives at least one additional PTO.

12. The device of claim 1 further comprising:
a frame or base that in combination with the at least one float is buoyant and is pivotably attached up sea of the at least one float's forward face to a single pivoting point on a mooring, piling, or stabilizing or anchoring device to permit at least horizontal piano pivoting and to further permit the float's forward face to be elf-orienting parallel to oncoming wave fronts that apply lateral impact force to the float's forward face; and,
a downward sloping wave focusing or shoaling plane, wherein the shoaling plane at least partially precedes the at least one float to direct wave energy from water depths below the float's forward face toward the at least one float and float face.

* * * * *